(12) United States Patent
Inoue et al.

(10) Patent No.: US 8,174,579 B2
(45) Date of Patent: May 8, 2012

(54) RELATED SCENE ADDITION APPARATUS AND RELATED SCENE ADDITION METHOD

(75) Inventors: Tsuyoshi Inoue, Nara (JP); Jun Ozawa, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/865,879

(22) PCT Filed: Aug. 10, 2009

(86) PCT No.: PCT/JP2009/003836
§ 371 (c)(1),
(2), (4) Date: Aug. 3, 2010

(87) PCT Pub. No.: WO2010/021102
PCT Pub. Date: Feb. 25, 2010

(65) Prior Publication Data
US 2011/0008020 A1    Jan. 13, 2011

(30) Foreign Application Priority Data

Aug. 22, 2008  (JP) ................................. 2008-214654

(51) Int. Cl.
*H04N 7/18* (2006.01)
(52) U.S. Cl. ........................................ 348/157; 348/143
(58) Field of Classification Search .................. 348/143, 348/157
See application file for complete search history.

(56) References Cited

U.S. PATENT DOCUMENTS
2005/0069107 A1    3/2005    Tanaka et al.
2008/0133607 A1    6/2008    Tanaka et al.

FOREIGN PATENT DOCUMENTS

| JP | 11-353325 | 12/1999 |
|---|---|---|
| JP | 2003-150928 | 5/2003 |
| JP | 2004-080476 | 3/2004 |
| JP | 2005-033619 | 2/2005 |
| JP | 2005-115504 | 4/2005 |
| JP | 2007-049739 | 2/2007 |

OTHER PUBLICATIONS

International Search Report issued Sep. 8, 2009 in International (PCT) Application No. PCT/JP2009/003836.
JPO Notice of Reasons for Rejection, issued Dec. 8, 2009 in counterpart application JP 2009-545752 (with English translation).
Muneo Kitajima, "Latent Semantic Analysis; LSA", Journal of Japan Society for Fuzzy Theory and Intelligent Informatics vol. 17, No. 1, Feb. 2005, pp. 76 (with English translation).
Kenji Kita et al., "Joho Kensaku Algorithm (Information Retrieval Algorithm)", Kyoritsu Shuppan Co., Ltd., Jan. 2002, pp. 65-66 (with partial English translation).

*Primary Examiner* — Allen Wong
(74) *Attorney, Agent, or Firm* — Wenderoth, Lind & Ponack, L.L.P.

(57) ABSTRACT

A related scene addition apparatus, capable of extracting a related scene even when information on a moving image content having no information related to each scene, such as text information, has been retrieved, includes: an operation record storage unit (105) storing operation records of information retrieval by the user who is watching the video; a retrieved result storage unit (103) storing a result of the information retrieval to be transmitted to another terminal; a retrieval start time estimating unit (107) estimating the time when the user starts retrieving information corresponding to the result, using the operation records stored by the operation record storage unit (105); a related scene extracting unit (108) extracting a scene of the video at the estimated retrieval start time; and a retrieval result output unit (111) providing the result of information added with the related scene in order to transmit the provided result to another terminal.

16 Claims, 16 Drawing Sheets

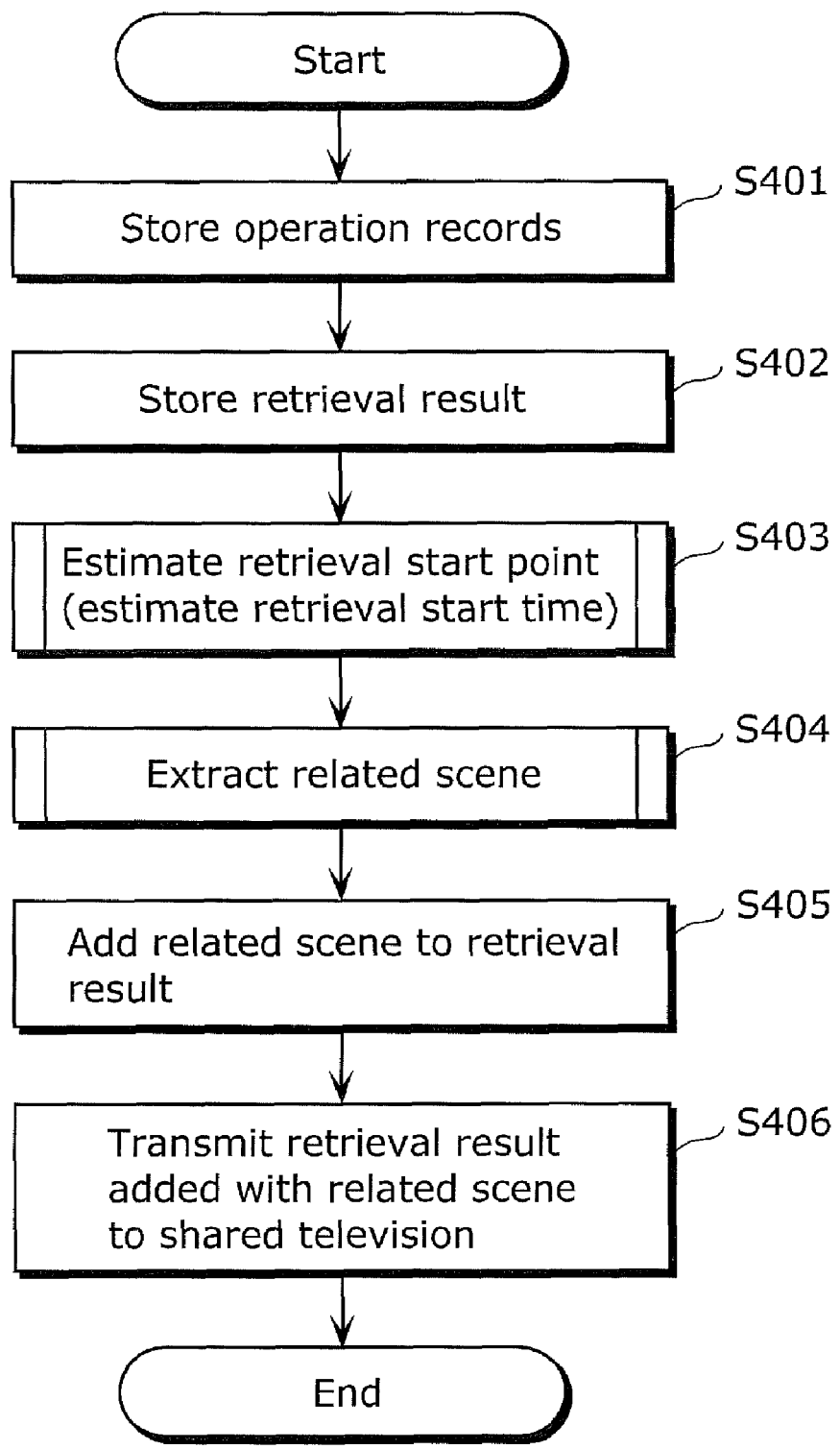

FIG. 5

| Operation number | Operation time | Displayed URL | Retrieval word (input word) | Selection item (selected word) | Other operations |
|---|---|---|---|---|---|
| 1 | 19:53:30 | | | | Startup |
| 2 | 19:54:00 | http://www.**** | Drama Takuma Kimura | | Execute retrieval |
| 3 | 19:54:10 | http://www.**** | | | Return |
| 4 | 19:55:00 | http://www.**** | Drama Takuma Kimura Monday from 9, 2008 | | Execute retrieval |
| 5 | 20:00:30 | http://www.**** | | Chance | Select link |
| 6 | 20:20:00 | http://www.**** | | | Home |
| 7 | 20:21:20 | http://www.**** | Offside | | Execute retrieval |
| 8 | 20:23:00 | http://www.**** | | Offside (soccer) -Wike | Select link |
| 9 | 20:28:30 | http://www.**** | | | Return |
| 10 | 20:30:10 | http://www.**** | | "Rule book (offside)" | Select link |
| 11 | 20:33:10 | http://www.**** | | | Add related scene |

→ Time

RELATED SCENE ADDITION APPARATUS AND RELATED SCENE ADDITION METHOD

TECHNICAL FIELD

The present invention relates to a related scene addition apparatus and a related scene addition method for supporting addition of a scene of a moving image content related to a retrieval result, when information of the retrieval result related to the scene is shared with others.

BACKGROUND ART

In recent years, many households have introduced personal computers (hereinafter referred to as PCs), and there are an increasing number of users who operate their PCs while watching televisions. Accordingly, while the users watch moving image contents, for example, television programs that are currently being broadcast, they increasingly retrieve information related to the television programs using search engines of the Internet. When a television program that is being watched is a travel information program, information to be retrieved is, for example, information related to a place or a shop that is currently being displayed. Furthermore, when the television program is a quiz program, the information to be retrieved is information related to answers of the given quizzes. Furthermore, when the television program is an animal program, the information to be retrieved is information related to a name of an animal that is being displayed or a place where the animal can be seen. Furthermore, when the television program is a sport program, such as programs of soccer and baseball, the information to be retrieved is information related to a movement and a rule, in addition to information related to a player who is being displayed.

As such, when a scene in a television program that is being watched motivates the user to start retrieving information related to the scene, what is probably effective is sharing, with others, the scene that motivates the retrieval for obtaining a retrieval result.

Under such circumstances, conventionally proposed is a digital video reproducing apparatus that extracts a scene that motivates retrieval of information, using subtitle information included in a content (for example, see PTL 1). The digital video reproducing apparatus generates a table in which subtitle data is associated with time information indicating when the data is provided, in response to a request for recording the content from the user. Furthermore, in response to an instruction for retrieving video by characters entered by the user, the digital video reproducing apparatus retrieves a subtitle related to the characters entered by the user using the generated table, and reproduces video obtained at the time when the retrieved subtitle is provided.

CITATION LIST

Patent Literature

[PTL 1] Japanese Unexamined Patent Application Publication No. 2004-80476

SUMMARY OF INVENTION

Technical Problem

However, the digital video reproducing apparatus disclosed in PTL1 uses subtitle information. Thus, there is a problem that a scene of a broadcast program that motivates the retrieval of information cannot be extracted from a content having no subtitle. For example, there is no case where subtitles are added to a live broadcast program such as a sport program of soccer, baseball, and others. Thus, the range where the digital video reproducing apparatus is applicable is limited.

Furthermore, the digital video reproducing apparatus retrieves information based on a character entered by the user. Thus, it is necessary to grasp the keyword displayed in a scene that motivates the user to retrieve information and enter the keyword. Furthermore, when the entered keyword is used in plural subtitles, the digital video reproducing apparatus detects plural scenes. Thus, increase in the number of keywords increases the number of retrieval results. Accordingly, there is a problem that it takes some effort to retrieve a scene that motivates the user to retrieve information desired by the user.

The present invention has been conceived in order to solve the problems. The present invention has an object of providing a related scene addition apparatus and a related scene addition method for allowing for extraction of a scene that motivates the user to retrieve information, even when each scene of a content is not added with a text tag, such as a subtitle.

Solution to Problem

In order to achieve the object, the related scene addition apparatus in the present invention is a related scene addition apparatus that associates a related scene with a retrieval result, the related scene being image data related to retrieval, and includes: an image storage unit configured to store the image data, and a time at which the image data is reproduced; an information retrieving unit configured to retrieve information according to a retrieval condition entered by a user; an operation record storage unit configured to store operation records in which the retrieval condition is associated with a time at which the information retrieving unit has received the retrieval condition; a retrieval start time estimating unit configured to estimate a retrieval start time based on a retrieval start point of a corresponding one of the operation records related to a scene-to-be-added retrieval result, the retrieval start time being a time at which the user starts entering retrieval conditions including the retrieval condition for obtaining the scene-to-be-added retrieval result, and, the scene-to-be-added retrieval result being retrieval information specified by the user in the information retrieved by the information retrieving unit; and a related scene extracting unit configured to associate, with the scene-to-be-added retrieval result, the image data reproduced during a time period including the retrieval start time estimated by the retrieval start time estimating unit.

With this configuration, what can be identified is the operation record closely associated with and temporally closest to the as scene-to-be-added retrieval result. In other words, what can be identified is the operation record that motivates the user to start retrieving the same details of information for the scene-to-be-added retrieval result. Furthermore, when the user has retrieved information while watching moving image data, a scene related to information retrieved by the user probably appears around the time at which the user starts the retrieval. Thus, the image data of the operation record present around the time at which the user starts the retrieval is extracted as a related scene. Thus, the related scene that motivates the user to retrieve information can be extracted.

The present invention can be implemented not only as a related scene addition apparatus including characteristic processing units but also as a related scene addition method using such characteristic processing units included in the related scene addition apparatus as steps. Furthermore, the present invention can be implemented as a program causing a computer to execute the characteristic steps included in the related scene addition method. Such a program may be distributed through a recording medium, such as a Compact Disc-Read Only Memory (CD-ROM) and via a communication network, such as the Internet.

Advantageous Effects of Invention

As described above, the related scene addition apparatus according to the present invention can extract a scene that motivates retrieval of information from a moving image content to which no information related to scenes is added to each of the scenes, such as text information. Furthermore, with the related scene addition apparatus according to the present invention, there is no need to enter a keyword only for extracting a scene. Thus, the user's load of adding a related scene to an information retrieval result can be reduced.

BRIEF DESCRIPTION OF DRAWINGS

FIG. 4 shows a flowchart of processes executed by a related scene addition apparatus according to Embodiment 1 in the present invention.

FIG. 5 illustrates an example of operation record information according to Embodiment 1 in the present invention.

DESCRIPTION OF EMBODIMENTS

Embodiments in the present invention will be hereinafter described with reference to the drawings.

Embodiment 1

In Embodiment 1, the user accesses a search server on the Internet, such as a PC and a mobile phone. Under this condition, it is assumed that an apparatus capable of retrieving information (hereinafter referred to as an information retrieval apparatus) retrieves information as being motivated by a scene in a television program while the user is watching the television program. Embodiment 1 describes a method of estimating a scene of a television program that motivates the retrieval of the information when an information retrieval result obtained by the information retrieval apparatus is displayed on a shared television to share the information with others. Furthermore, Embodiment 1 describes a method of supporting an operation of adding the estimated scene to the information retrieval result. For example, when family members are watching a live soccer program and an offside occurs, suppose a case where the user who is one of the family members immediately retrieves information about the offside. Under such circumstances, a retrieval system for associating a retrieval result related to the offside to a scene of the offside will be described hereinafter.

Figure 1:
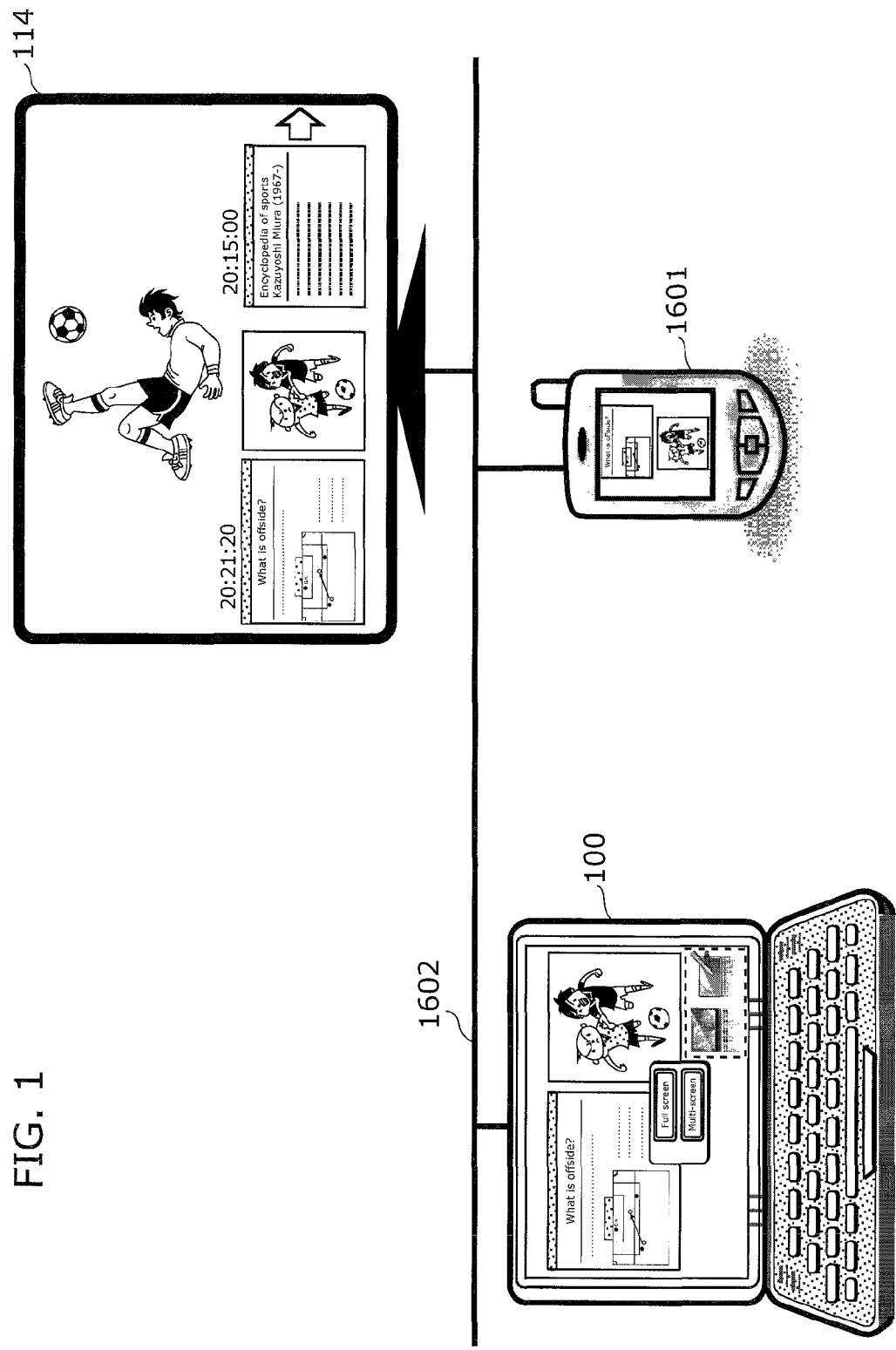
FIG. 1 illustrates an outline view of a configuration of a retrieval system according to Embodiment 1 in the present invention.

FIG. 1 illustrates an outline view of a configuration of a retrieval system according to Embodiment 1 in the present invention. As illustrated in FIG. 1, the retrieval system includes a related scene addition apparatus 100, a shared television 114, and a mobile terminal 1601 that are interconnected to each other via a computer network 1602 such as a Local Area Network (LAN).

Figure 2:
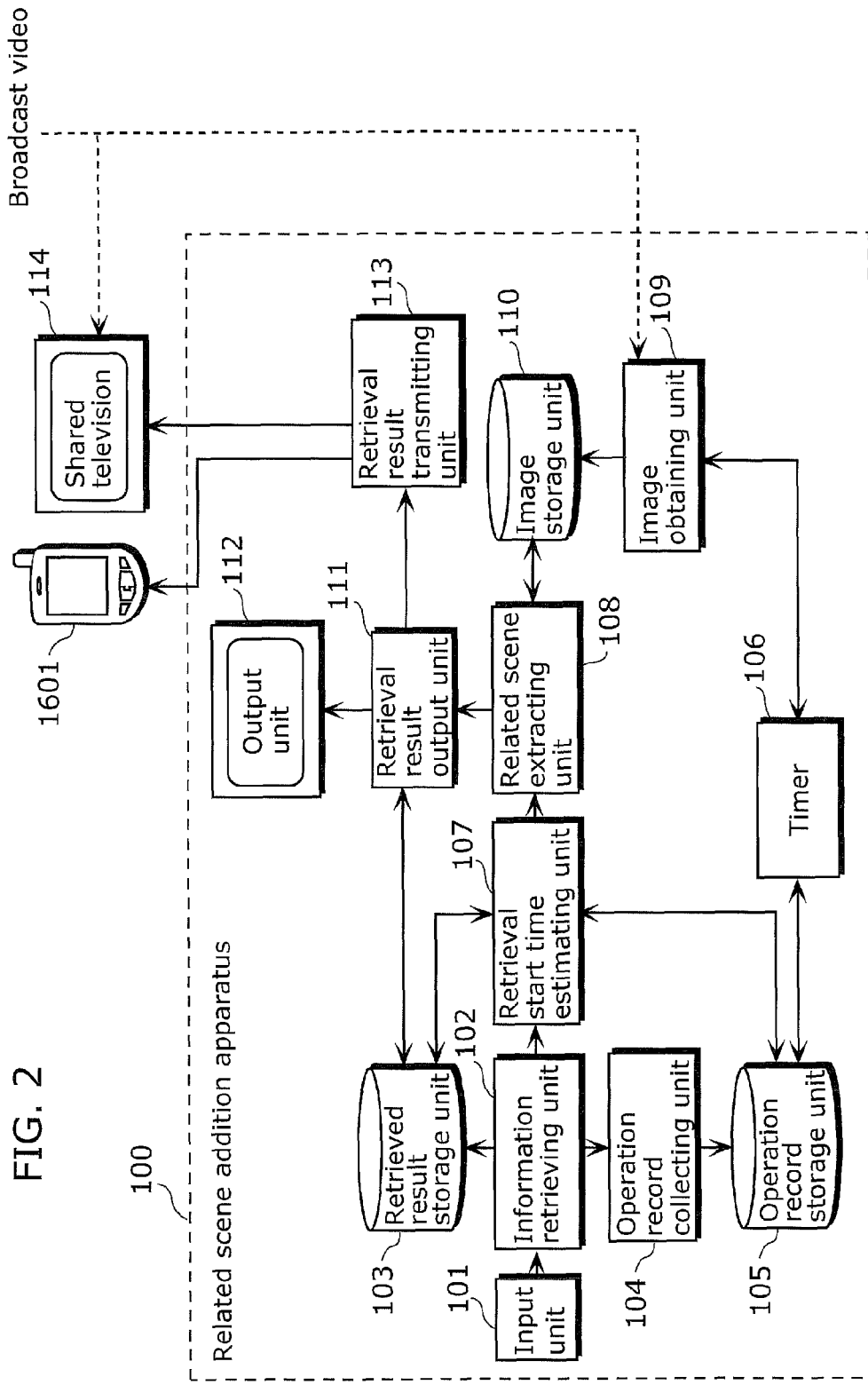
FIG. 2 is a block diagram illustrating the configuration of the retrieval system according to Embodiment 1 in the present invention.

FIG. 2 is a block diagram illustrating a configuration of the retrieval system according to Embodiment 1 in the present invention.

The retrieval system is a system that retrieves information, and adds an information retrieval result to a scene of a television program that motivates the retrieval of information to display the information retrieval result. The retrieval system includes the related scene addition apparatus 100, the shared television 114, and the mobile terminal 1601.

The related scene addition apparatus 100 is an apparatus that retrieves information, and adds an information retrieval result to a scene of a television program that motivates the retrieval of information. The related scene addition apparatus 100 includes an input unit 101, an information retrieving unit 102, a retrieved result storage unit 103, an operation record collecting unit 104, an operation record storage unit 105, and a timer 106. The related scene addition apparatus 100 further includes a retrieval start time estimating unit 107, a related scene extracting unit 108, an image obtaining unit 109, an image storage unit 110, a retrieval result output unit 111, an output unit 112, and a retrieval result transmitting unit 113.

The related scene addition apparatus 100 is configured with a general-purpose computer including a Central Processing Unit (CPU), a memory, and a communication interface. Each of the processing units included in the related scene addition apparatus 100 is functionally implemented by executing a program for implementing each of the processing units on the CPU. Furthermore, each of the storage units is implemented by a memory and a Hard Disk Drive (HDD).

The input unit 101 is a processing unit that receives an input from the user, such as a button, a touch panel, and an arrow key. The information retrieving unit 102 is a processing unit that executes retrieval of information by accessing a search server on the Internet. The retrieved result storage unit 103 is a storage device that stores an information retrieval result obtained by the information retrieving unit 102. Here, the retrieval result stored in the retrieved result storage unit 103 is a retrieval result obtained when the user specifies addition of a scene. The operation record collecting unit 104 is a processing unit that collects operation records of the information retrieval by the information retrieving unit 102. In other words, the operation record collecting unit 104 collects records of operations, such as a keyword entered when the user has retrieved information, a word included in a selected item, a Uniform Resource Locator (URL) indicated by the selected item, and an instruction by the user. The operation record storage unit 105 is a storage device that stores the operation records collected by the operation record collecting unit 104. The timer 106 is a processing unit that obtains a current time.

The retrieval start time estimating unit 107 is a processing unit that estimates a time at which the user starts retrieving information. In other words, the retrieval start time estimating unit 107 estimates a retrieval start operation performed at the time when the user starts retrieving information corresponding to a retrieval result stored in the retrieved result storage unit 103, using the retrieval result stored in the retrieved result storage unit 103 and the operation records stored in the operation record storage unit 105. Furthermore, the retrieval start time estimating unit 107 estimates the time at which the user starts retrieving the information corresponding to the retrieval result, using the time at which the retrieval start operation is executed. As such, the retrieval start time estimating unit 107 estimates the time at which the user starts entering a retrieval condition for the purpose of obtaining the retrieval result specified by the user from among records of retrieval conditions that are entered for obtaining the retrieval result.

The related scene extracting unit 108 is a processing unit that extracts, from the image storage unit 110 as a scene related to the retrieval result stored in the retrieved result storage unit 103, a scene that is obtained around the time that is estimated by the retrieval start time estimating unit 107 and is a time at which the user starts retrieving information. Although assumed in Embodiment 1 is the processing performed on a moving image content, the same in processing can be performed on a still image content. The image obtaining unit 109 is a processing unit that obtains moving images that motivate the retrieval. The moving images obtained by the image obtaining unit 109 are equivalent to a television program content that is being broadcast or a stored moving image content. The image storage unit 110 is a storage device that stores the moving image data obtained by the image obtaining unit 109 and the time at which the data has been reproduced.

The retrieval result output unit 111 is a processing unit that combines a retrieval result stored in the retrieved result storage unit 103 with a related scene extracted by the related scene extracting unit 108, and provides a combined result to the output unit 112. The output unit 112 is a display device, such as a display for displaying a result of the output from the retrieval result output unit 111. The retrieval result transmitting unit 113 is a processing unit that transmits data of a result obtained by combining the retrieval result generated by the retrieval result output unit 111 with the related scene.

The shared television 114 is a television that can receive the data transmitted from the retrieval result transmitting unit 113 and display the received data. For example, the shared television 114 is an oversize television that is placed in a living room, etc. The shared television 114 displays the data of the retrieval result added with the related scene by the related scene addition apparatus 100, so that plural users can share the information.

The mobile terminal 1601 is a mobile terminal that can receive the data transmitted from the retrieval result transmitting unit 113 and display the received data. For example, the mobile terminal 1601 is a device used while being carried by the user, and is a mobile phone and others.

The following processes will be described hereinafter as an example of the related scene addition apparatus 100 configured in the above manner. In other words, the related scene addition apparatus 100 estimates the scene that motivates the user to retrieve information while watching it through the shared television 114, from the operation records and the retrieval result in the processes. Furthermore, the related scene addition apparatus 100 transmits the retrieval result added with the estimated scene to the shared television 114.

Figure 3:
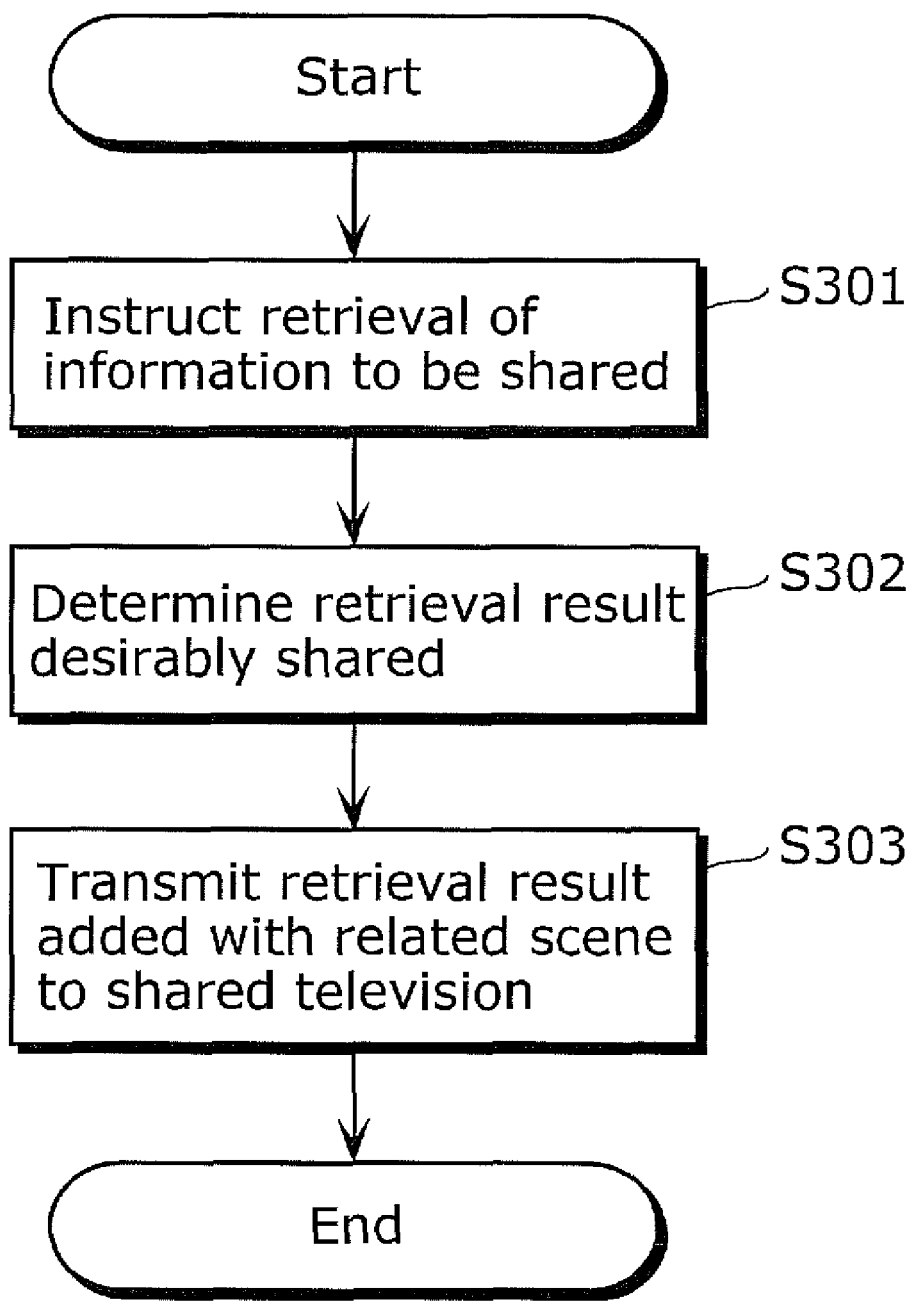
FIG. 3 shows a flowchart indicating an operation procedure of a user according to Embodiment 1 in the present invention.

FIG. 3 shows a flowchart indicating the operation procedure of the user. FIG. 4 shows a flowchart of the processes executed by the related scene addition apparatus 100.

Embodiment 1 assumes that the image obtaining unit 109 obtains the moving image content of a program that the user watches through the shared television 114, and the image storage unit 110 stores the content. Although the image obtaining unit 109 and the image storage unit 110 are included in the related scene addition apparatus 100 in FIG. 2, the related scene addition apparatus 100 is not limited to this configuration. For example, the moving image content may be stored in a recording apparatus outside the related scene addition apparatus 100, and the related scene extracting unit 108 may extract a scene from the moving image content stored in the recording apparatus.

As being motivated by a scene in a television program, the user instructs the related scene addition apparatus 100 to retrieve information through the input unit 101 (S301). For example, when the user is watching a travel information program, the user instructs the related scene addition apparatus 100 to retrieve information related to a place or a shop that is currently being displayed. Furthermore, when the user is watching a quiz program, the user instructs the related scene addition apparatus 100 to retrieve information related to answers of the given quizzes. Furthermore, when the user is watching an animal program, the user instructs the related scene addition apparatus 100 to retrieve information related to a name of an animal that is being displayed or a place where the animal can be seen. Furthermore, when the user is watching a sport program, such as programs of soccer and baseball, the user instructs the related scene addition apparatus 100 to retrieve information related to a player who is being displayed or information related to a movement of the player and a rule of the sport. Embodiment 1 assumes a case where, while the user is watching a live soccer program, an offside occurs, and the user retrieves information on the rule of offside by accessing a search server on the Internet.

In response to the information retrieval instruction (S301), the information retrieving unit 102 of the related scene addition apparatus 100 executes the retrieval processes. Furthermore, the operation record collecting unit 104 stores the operation records of the information retrieval by the user in the operation record storage unit 105 (S401). Here, there are cases not only where a scene of a television program motivates the user to retrieve information but also where the user simply retrieves information for his/her interest. Thus, the operation record collecting unit 104 stores all the operations of retrieving information by the information retrieving unit 102, in the operation record storage unit 105. In order not to exceed the storage capacity of the operation record storage unit 105, the stored operation records may be emptied, for example, at the end of a day, and at a timing when no operation record of the user is detected for a certain period of time. Furthermore, the stored operation records may be emptied from the earliest one.

FIG. 5 illustrates an example of the operation record information stored in the operation record storage unit 105. The operation record information includes operation records including an operation number 501, an operation time 502, a displayed URL 503, a retrieval word 504, a selection item 505, and other operations 506.

The operation number 501 is a number for identifying an operation record, and is numbered from an operation record at the earlier time indicated in the operation time 502 in ascending order. The operation time 502 is information indicating a time at which the user operates the related scene addition apparatus 100 through the input unit 101. The displayed URL 503 is information indicating a URL of a web page displayed on the output unit 112 at the time of the user's operation. The retrieval word 504 is information indicating a retrieval word entered by the user. The retrieval word may be the one entered by the user using a keyboard or a button in the input unit 101, or may be a retrieval keyword provided by the related scene addition apparatus 100. The selection item 505 is information indicating an item selected by the user from a list of retrieval results displayed on the output unit 112 or from the web page for transition to another web page associated with a URL. The other operations 506 are information indicating an operation enabled by the information retrieving unit 102, such as a retrieving operation for retrieval of information, an operation for returning to one previous web page, and an operation for newly creating a window.

For example, when the user performs the operations indicated in the operation record information in FIG. 5, it is assumed that video of a soccer game is being broadcast through the shared television 114. Furthermore, it is assumed that a specific example of the operation records in FIG. 5 has occurred under the following circumstance. In other words, the user was first retrieving information for a drama where Takuma Kimura appears. The drama is unrelated to the content broadcast through the shared television 114 but interests the user. Furthermore, the user was browsing the retrieval results. Later, the offside occurred in the soccer game broadcast through the shared television 114. Since the family member requested the user to explain the offside, the user started retrieving information related to the offside for the explanation.

Figure 6A:
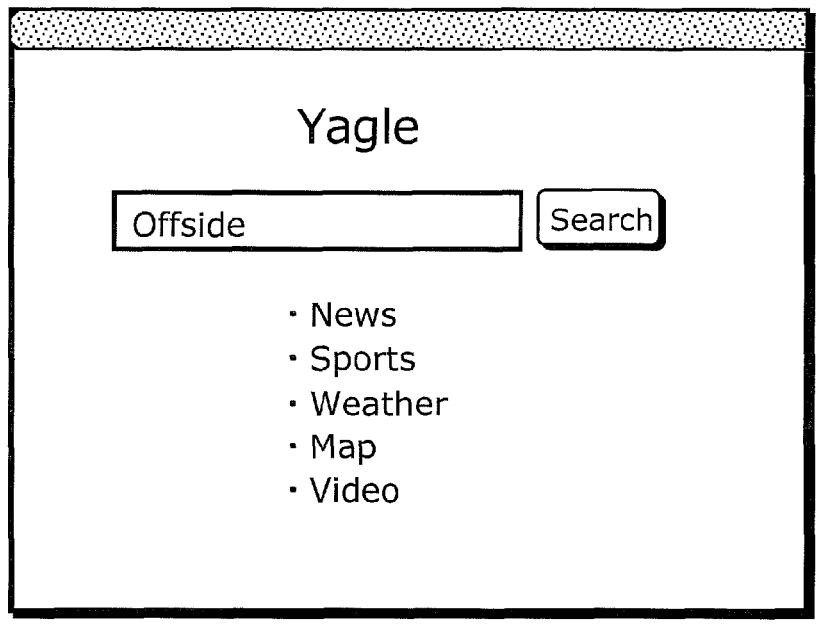
FIG. 6A illustrates an example of an output page of a related scene addition apparatus according to Embodiment 1 in the present invention.
Figure 6B:
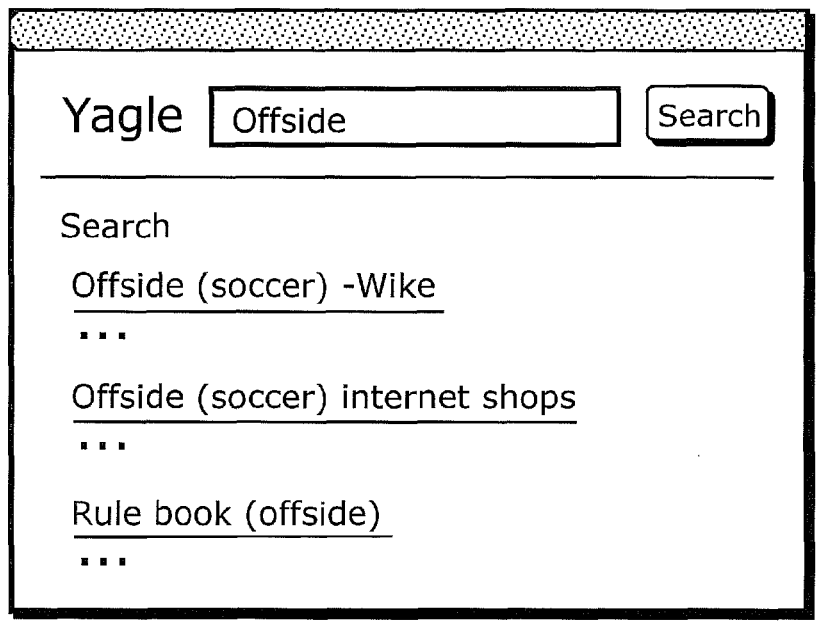
FIG. 6B illustrates an example of an output page of the related scene addition apparatus according to Embodiment 1 in the present invention.
Figure 6C:
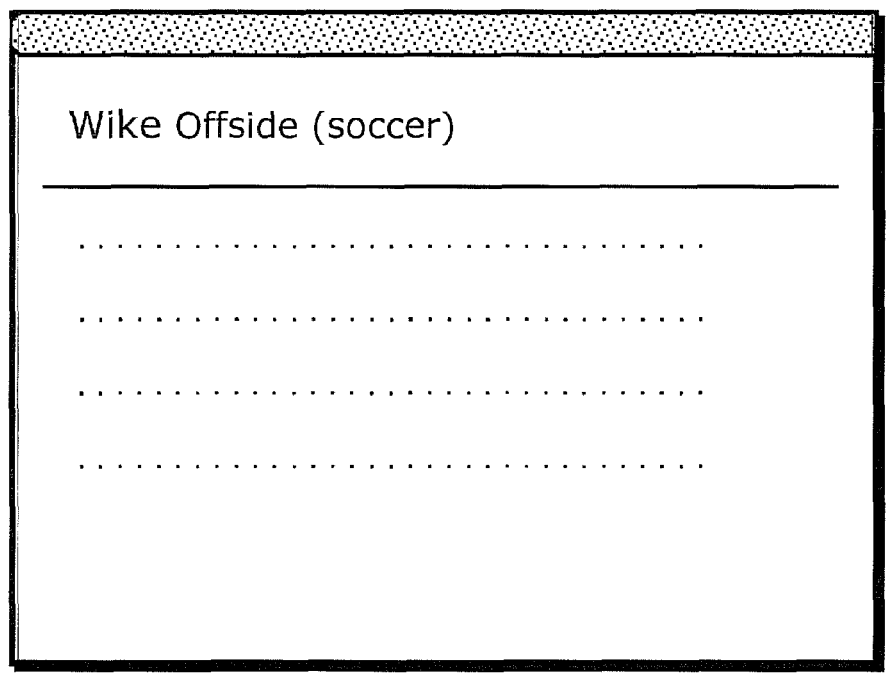
FIG. 6C illustrates an example of an output page of the related scene addition apparatus according to Embodiment 1 in the present invention.
Figure 6D:
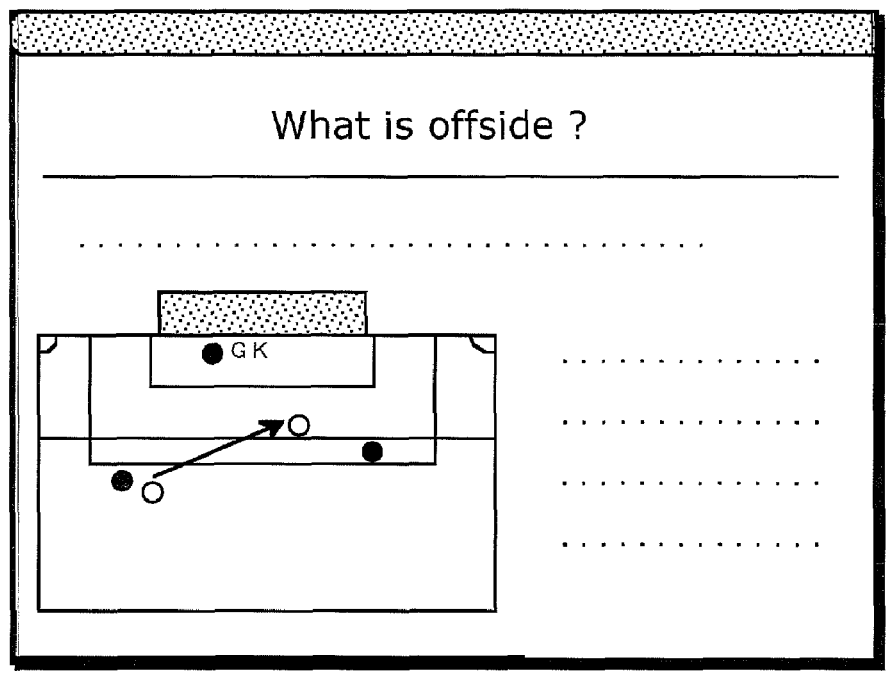
FIG. 6D illustrates an example of an output page of the related scene addition apparatus according to Embodiment 1 in the present invention.

FIGS. 6A to 6D illustrate examples of display screens when information related to the offside has been retrieved. First, the user enters a keyword "offside" in a keyword-input retrieval word input page as illustrated in FIG. 6A (the operation number 7 in FIG. 5). As a result of the retrieval, retrieval results as illustrated in FIG. 6B are displayed. The user selects a selection item (link) "offside (soccer)—Wike" from the retrieval results (the operation number 8 in FIG. 5). As a result of the selection, a page as illustrated in FIG. 6C is displayed. The user examines whether or not plural users share the page by displaying it on the shared television 114. However, the user determines that the page is not suitable for being shared among the plural users, and performs the operation for returning to the display screen (FIG. 6B) where the previous retrieval result is displayed (the operation number 9 in FIG. 5). Then, the user reselects "rule book (offside)" from the retrieval results in FIG. 6B (the operation number 10 in FIG. 5). As a result of the reselection, a page as illustrated in FIG. 6D is displayed. As a result of the examination on the page, the user determines that the page is shared among the plural users, and requests the related scene addition apparatus 100 to add a related scene to the page.

For example, there are cases where the retrieval word or the selection item "offside" is entered using a keyboard or a numeric keypad. Thus, although there are cases where Roman letters, such as "o, f, u, s, a, i, d, o" are entered in Japanese, in Embodiment 1, the input word unit is determined by separating a key phrase into meaningful word units each of which functions as an operation so that the records shown in FIG. 5 are generated.

The user determines a retrieval result desirably shared, that is, a retrieval result desirably added with a related scene (hereinafter referred to as "scene-to-be-added retrieval result") (S302). The user requests the related scene addition apparatus 100 to add a related scene by performing predetermined operations through the input unit 101, in a state where the output unit 112 displays the retrieval result.

In response to the request of adding a related scene from the user (S302), the information retrieving unit 102 store the scene-to-be-added retrieval result in the retrieved result storage unit 103 (S402). Next, the retrieval start time estimating unit 107 as estimates a time at which the user starts retrieving information to obtain the scene-to-be-added retrieval result (hereinafter referred to as "retrieval start time") based on the operation of starting the retrieval of information for the scene-to-be-added retrieval result (hereinafter referred to as "retrieval start point") (S403). Then, the related scene extracting unit 108 extracts a related scene from the image storage unit 110 based on the retrieval start time (S404).

The process of estimating the retrieval start point (S403) includes determining whether or not the user has retrieved an item equivalent to an item retrieved for the scene-to-be-added retrieval result based on the operation records of the user, and using a result of the determination for estimating the retrieval start point. In other words, when the scene-to-be-added retrieval result is similar to information entered or browsed by the user when the information has been retrieved, the retrieval, start time estimating unit 107 estimates the retrieval start point using a feature that the user has retrieved the same details of information between the two retrieval operation records. Furthermore, even when the information entered by the user is similar to the information browsed by the user when the information has been retrieved, the retrieval start time estimating unit 107 estimates the retrieval start point using the feature that the user has retrieved the same details of information between the two retrieval operation records. The processes will be further described in detail.

Figure 7:
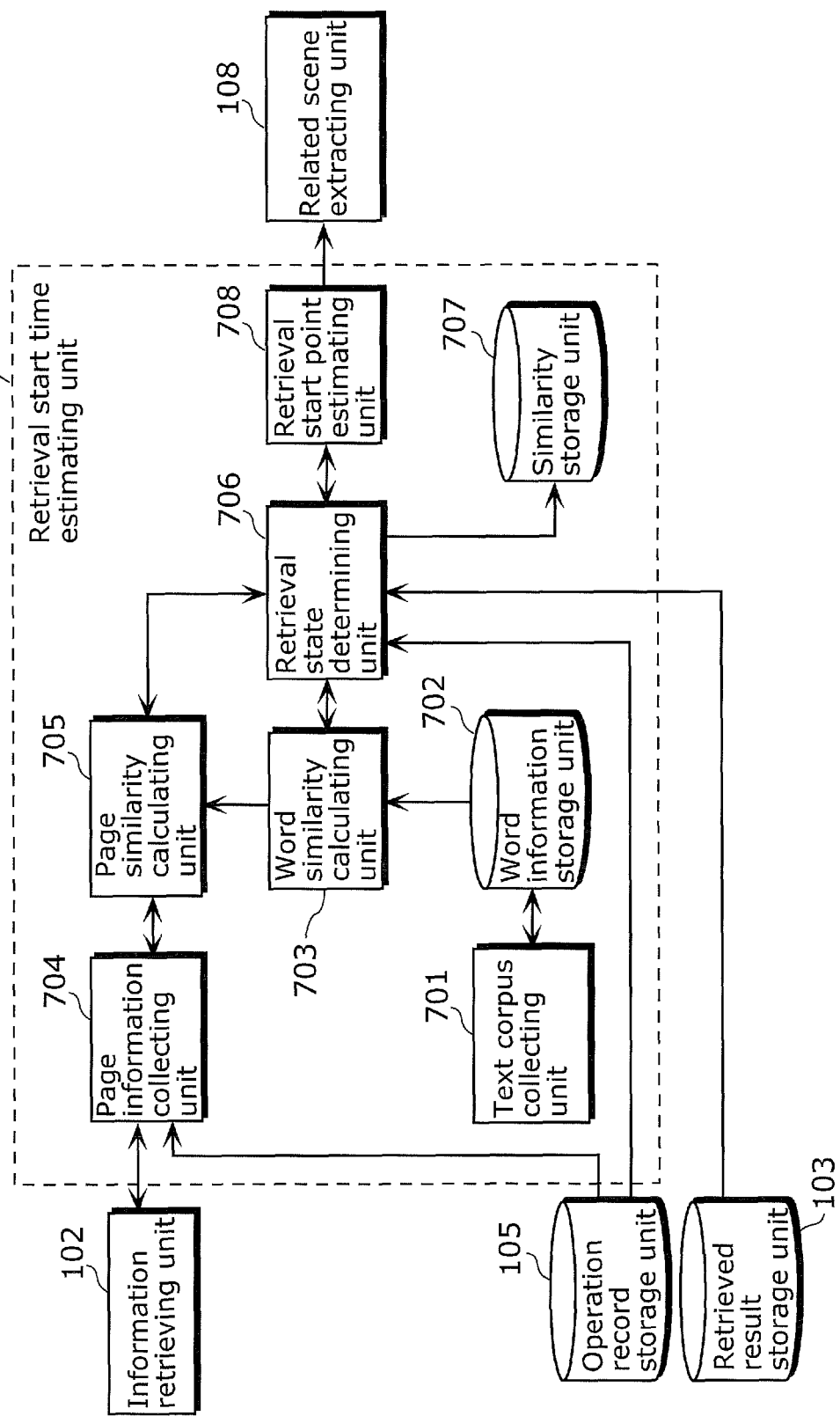
FIG. 7 illustrates a functional block diagram of a detailed configuration of a retrieval start time estimating unit according to Embodiment 1 in the present invention.
Figure 8:
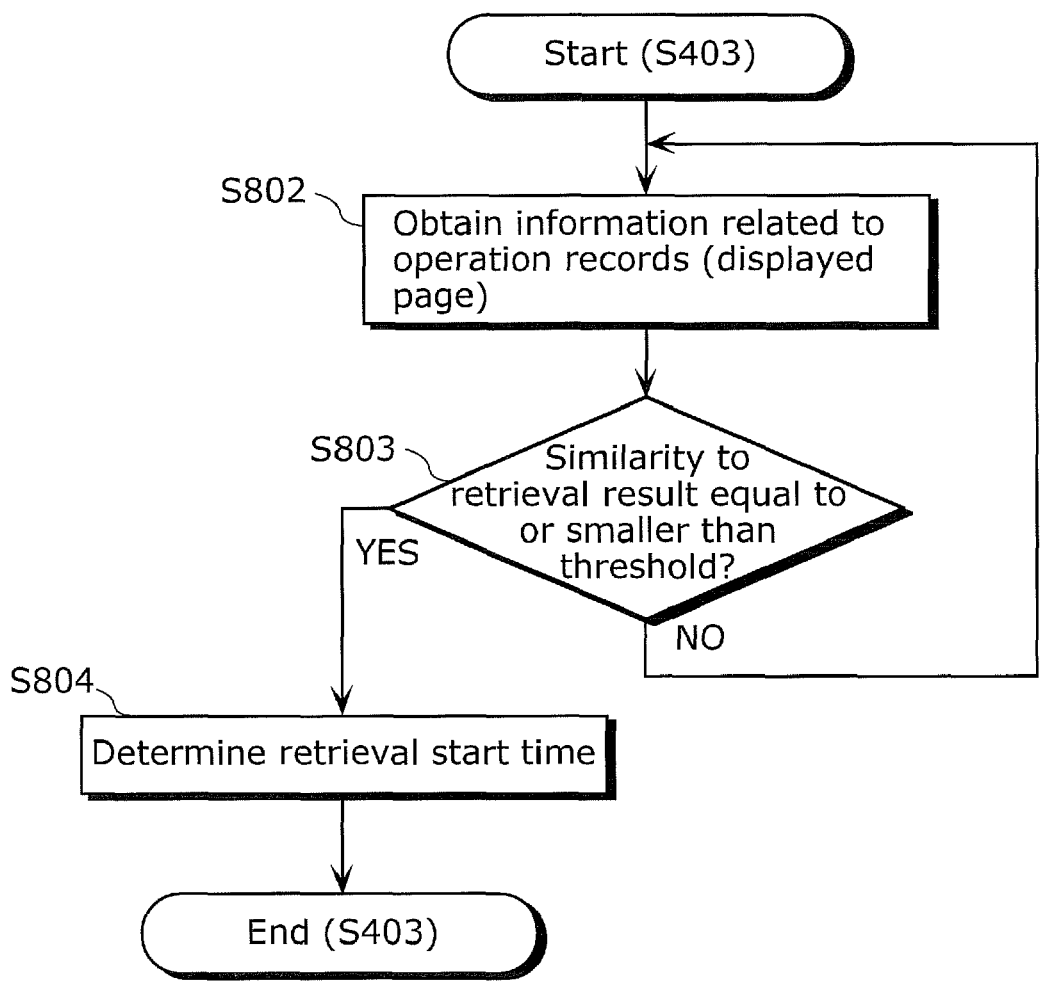
FIG. 8 shows a detailed flowchart of a process of estimating a retrieval start point according to Embodiment 1 in the present invention.

FIG. 7 illustrates a functional block diagram of a detailed configuration of the retrieval start time estimating unit 107. FIG. 8 shows a detailed flowchart of the process of estimating the retrieval start point (S403 in FIG. 4) executed by the retrieval start time estimating unit 107.

As illustrated in FIG. 7, the retrieval start time estimating unit 107 includes a text corpus collecting unit 701, a word information storage unit 702, a word similarity calculating unit 703, a page information collecting unit 704, a page similarity calculating unit 705, and a retrieval state determining unit 706.

The text corpus collecting unit 701 is a processing unit that collects a text corpus for use in quantifying a semantic similarity between words, and generates information for calculating a similarity between words or between at least one word and a document. The word information storage unit 702 is a storage device that stores the information that is for calculating the similarity and is generated by the text corpus collecting unit 701. The word similarity calculating unit 703 is a processing unit that calculates the similarity between words or between at least one word and a document, using the information stored in the word information storage unit 702.

The page information collecting unit 704 is a processing unit that collects information of a page browsed by the user or information related to the scene-to-be-added retrieval result. The page similarity calculating unit 705 is a processing unit that calculates a similarity between specified pages, based on the page information collected by the page information collecting unit 704. The retrieval state determining unit 706 is a processing unit that determines whether or not the user has retrieved the same item between operations, based on the operation records and the scene-to-be-added retrieval result. A similarity storage unit 707 is a storage device that stores information for determining whether or not the same item has been retrieved. A retrieval start point estimating unit 708 is a processing unit that estimates a retrieval start point and a retrieval start time using a result of the determination by the retrieval state determining unit 706.

Here, the processes of generating information for calculating a similarity by the text corpus collecting unit 701 will be described in detail. The processes by the text corpus collecting unit 701 are executed separately from the processes of adding a related scene by the related scene addition apparatus 100.

The text corpus collecting unit 701 collects a large amount of documents, and extracts useful words (hereinafter referred to as "index word") for use in retrieving a noun or a verb, from among the collected documents. Then, the text corpus collecting unit 701 generates a dimensionally-reduced matrix by applying singular value decomposition to a matrix of an index word and a document that is a matrix representing the extracted index word and each document. Next, the text corpus collecting unit 701 calculates an index word vector and each document vector by representing the index word and each of the documents by a corresponding dimensionally-reduced vector, using the dimensionally-reduced matrix, respectively, and stores the calculated index word vector and each of the document vectors in the word information storage unit 702.

Calculating a semantic distance between index words using the index word vector and the document vectors that are generated based on the dimensionally-reduced matrix enables retrieval of a document based on the semantic similarity between the index words. These techniques are referred to as Latent Semantic Analysis (LSA) or Latent Semantic Indexing (LSI) (non Patent Literatures: Journal of Japan Society for Fuzzy Theory and Intelligent Informatics Vol. 17, No. 1, p. 76 (2005), Information retrieval algorithm (Kyoritsu Shuppan Co., LTD) p. 65 (2002)). With these techniques, the semantic similarity between words or between at least one word and a document can be quantified, and the computation speed in retrieving information can be improved.

In the LSA and the LSI, a more semantic similarity can be represented, and the dimensional reduction is performed to improve the computation speed in retrieval of information. However, even when the dimensional reduction is not performed, a similarity between words or between at least one word and a document can be quantified. Thus, a vector may be generated without the dimensional reduction, and the similarity may be calculated based on the generated vector. Furthermore, other than the methods, methods of obtaining a semantic similarity between words may include a method of generating the semantic similarity in advance by the user, and a method of calculating the semantic similarity using a dictionary, such as a thesaurus. For example, when a thesaurus in which semantic relations between words are represented in a hierarchical structure is used, the number of links between words and others can define a distance between the words.

Although a document collected by the text corpus collecting unit 701 may be a general corpus provided by a system developer, the document is not limited to such. For example, the text corpus collecting unit 701 may collect a corpus that can be obtained by retrieving a related document based on the scene-to-be-added retrieval result and obtained from a page having a larger similarity with the scene-to-be-added retrieval result. Furthermore, the text corpus collecting unit 701 may collect a corpus that can be obtained from pages browsed by the user for a predetermined period of time. As described above, generating a matrix necessary for calculating a semantic similarity between words using these unusual corpuses enables accurate representation of a distance between words during the actual retrieval of information by the user. Thus, the retrieval start point estimating unit 708 can estimate a retrieval start point with more precision. When a general corpus provided by a system developer in advance is used, the matrix necessary for calculating a semantic similarity between words has only to be generated once. In contrast, each time a text corpus is obtained based on a scene-to-be-added retrieval result, the matrix needs to be generated.

Furthermore, the distance between words can be automatically defined by using a text corpus, for example, obtained from a website. When information related to a news program or current topics is retrieved, proper names that are in at the time of retrieval are often used. Thus, when a retrieval start point is identified using the retrieval records obtained while programs that are categorized as a genre of a news program or current topics are being broadcast, there are cases where generating the matrix using a text corpus obtained from, for example, a website is more appropriate. In contrast, when a retrieval start point is identified using retrieval records of moving images that are categorized as a genre of an educational program, it is less likely that unknown words will emerge. Thus, the matrix may be generated using a dictionary, such as a thesaurus that has been constructed in advance. Furthermore, when a recorded program is being reproduced, the matrix is probably generated using (i) information obtained when the recorded program has been recorded and (ii) the text corpus that has been used at the recording date.

Next, the details of the process of estimating the retrieval start point (S403 in FIG. 4) will be described using FIG. 8.

The retrieval state determining unit 706 obtains information related to an operation record for each of which a retrieval state is to be determined (S802). In other words, the retrieval state determining unit 706 selects an operation record of entering a retrieval word or selecting a selection item, from among the operation record information stored in the operation record storage unit 105 as illustrated in FIG. 5. The retrieval state determining unit 706 obtains a group of the words entered or selected from a past operation record temporally closest to the operation of determining the scene-to-be-added retrieval result, among the selected operation records. The past operation record is indicated as an operation record having an operation record number closest to one of the operation numbers 501 in FIG. 5 of the operation of determining the scene-to-be-added retrieval result. Furthermore, the group of the words is indicated in "the rule book (offside)" of the operation number 10 in the specific example in FIG. 5.

The retrieval state determining unit 706 compares information related to an operation for determining the scene-to-be-added retrieval result with information related to the operation records for determining the retrieval states obtained in the process of obtaining the operation record information (S802) (S803). In other words, the retrieval state determining unit 706 obtains a scene-to-be-added retrieval result stored in the retrieved result storage unit 103, and extracts the text information included in the retrieval result. The retrieval state determining unit 706 causes the word similarity calculating unit 703 to vectorize the extracted text information using the dimensionally-reduced matrix. The vector generated as a result of the vectorization is referred to as a retrieval result vector. Similarly, the retrieval state determining unit 706 causes the word similarity calculating unit 703 to vectorize the group of words obtained in the process of obtaining the operation record information (S802), using the dimensionally-reduced matrix. The vector generated as a result of the vectorization is referred to as an input word vector. The retrieval state determining unit 706 causes the word similarity calculating unit 703 to calculate a similarity between the input word vector and the retrieval result vector, and stores the calculated similarity in the similarity storage unit 707. For example, a cosine measure (angle between two vectors) and an inner product that are often used for retrieving documents are used when a similarity between vectors is calculated.

Figure 9:
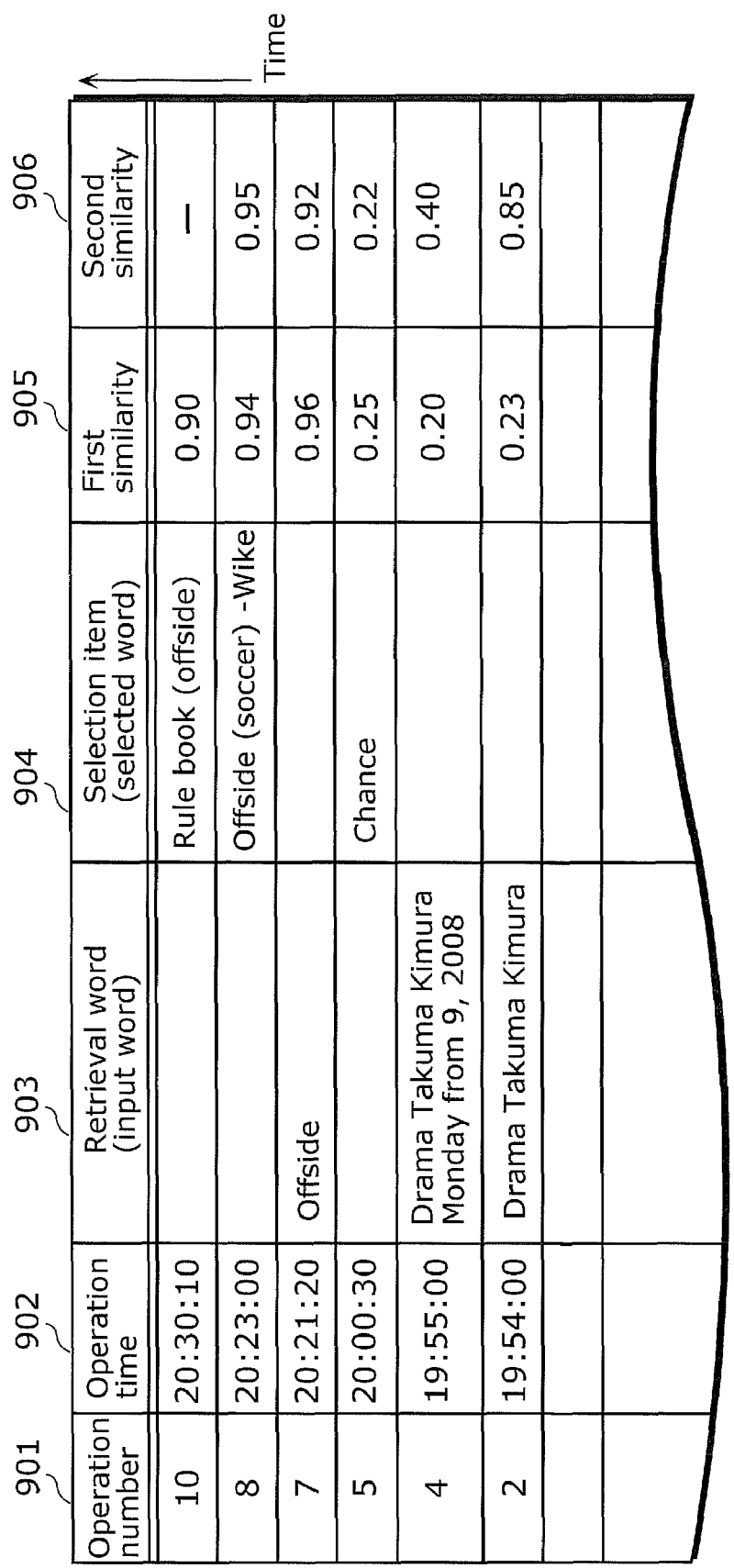
FIG. 9 illustrates an example of similarity information stored in a similarity storage unit according to Embodiment 1 in the present invention.

FIG. 9 illustrates an example of the similarity information calculated by the retrieval state determining unit 706 and stored in the similarity storage unit 707. The similarity information includes similarity records including an operation number 901, an operation time 902, a retrieval word 903, a selection item 904, a first similarity 905, and a second similarity 906.

The operation number 901, the operation time 902, the retrieval word 903, and the selection item 904 respectively correspond to the operation number 501, the operation time 502, the retrieval word 504, and the selection item 505 of the operation records in FIG. 5. The first similarity 905 is a similarity between the retrieval result vector and an input word vector generated by the group of words indicated in the retrieval word 903 or in the selection item 904, for each of the operation records. The second similarity 906 is a similarity between an input word vector included in an operation record immediately prior to the current operation record (temporally immediately subsequent to the current operation record) and the input word vector generated by the group of words indicated in the retrieval word 903 or in the selection item 904. Although the first similarity is calculated in the comparison process (S803), the second similarity may be calculated in combination with or instead of the calculation of the first similarity.

Next, the retrieval state determining unit 706 determines whether or not a similarity (first similarity) between the retrieval result vector and the input word vector is equal to or smaller than a threshold (S803). When the first similarity is larger than the threshold (No in S803), the retrieval state determining unit 706 determines that the retrieval of an item equivalent to an item obtained for the scene-to-be-added retrieval result has been continued. Then, the retrieval state determining unit 706 obtains information related to an operation record for which a retrieval state is to be next determined (S802). In other words, the retrieval state determining unit 706 performs an operation on an operation record of entering a retrieval word or selecting a selection item, from among the operation records stored in the operation record storage unit 105. The retrieval state determining unit 706 selects a past operation record temporally closest to an operation record in which a group of words is to be obtained in the process of obtaining one previous operation record (S802). The retrieval state determining unit 706 obtains a group of the words entered or selected from the selected operation record. In the specific example in FIG. 5, "offside (soccer)" of the operation number 8 is obtained.

When the first similarity is equal to or smaller than the threshold (Yes in S803), the retrieval state determining unit 706 determines that the retrieval of the item equivalent to the item obtained for the scene-to-be-added retrieval result ends. Thus, the retrieval start point estimating unit 708 determines a retrieval start time by determining a retrieval start point according to a method to be described hereinafter (S804).

For example, in the example of FIG. 9, assuming that the threshold is 0.5, each of the first similarities 905 of the operation number 10 to the operation number 7 is larger than the threshold (No in S803). Thus, the retrieval state determining unit 706 determines that the retrieval of the item equivalent to the item obtained for the scene-to-be-added retrieval result has been continued in the operations from the operation number 10 to the operation number 7. Furthermore, when a selection item "Chance" is selected in the operation indicated by the operation number 5, the first similarity 905 is smaller than the threshold for the first time (Yes in S803). Thus, the retrieval state determining unit 706 determines that the retrieval of the item equivalent to the item obtained for the scene-to-be-added retrieval result ends.

Next, the process of determining a retrieval start time (S804) will be described in detail. The retrieval start point estimating unit 708 determines an operation record having the smallest operation number (operation record that is temporally the earliest) as an retrieval start point, from among the operation records determined as being of the retrieval of the item equivalent to the item obtained for the scene-to-be-added retrieval result in the comparison process (S803). More specifically, the retrieval start point estimating unit 708 determines that the operation record in which the first similarity is larger than the threshold indicates the retrieval of the equivalent item. When the threshold is 0.5, the operation records of retrieving the equivalent item are the operation records indicated by the operation number 10 to the operation number 7. The retrieval start point estimating unit 708 estimates the operation record of the operation number 7 that is the smallest operation number as the retrieval start point. The retrieval start point estimating unit 708 determines the time at which the operation at the retrieval start point is executed as a retrieval start time. The retrieval start time is the operation time 902 included in an operation record corresponding to the retrieval start point. Since the operation record of the operation number 7 is at the retrieval start point in the aforementioned example, "20:21:20" that is the operation time 902 included in the operation record is determined as the retrieval start time.

After the retrieval start time is determined as described above (S403 in FIG. 4 and FIG. 8), the related scene extracting unit 108 extracts a scene at the retrieval start time from the image storage unit 110 (S404). Here, the related scene extracting unit 108 extracts moving image information preceding by a duration Δt with respect to the retrieval start time. In other words, the related scene extracting unit 108 extracts the moving image information in a range from (retrieval start time−Δt) to the retrieval start time, as a related scene. A fixed value predetermined by the system developer is used as Δt. Here, Δt is variable, and may be set by the user.

Figure 10:
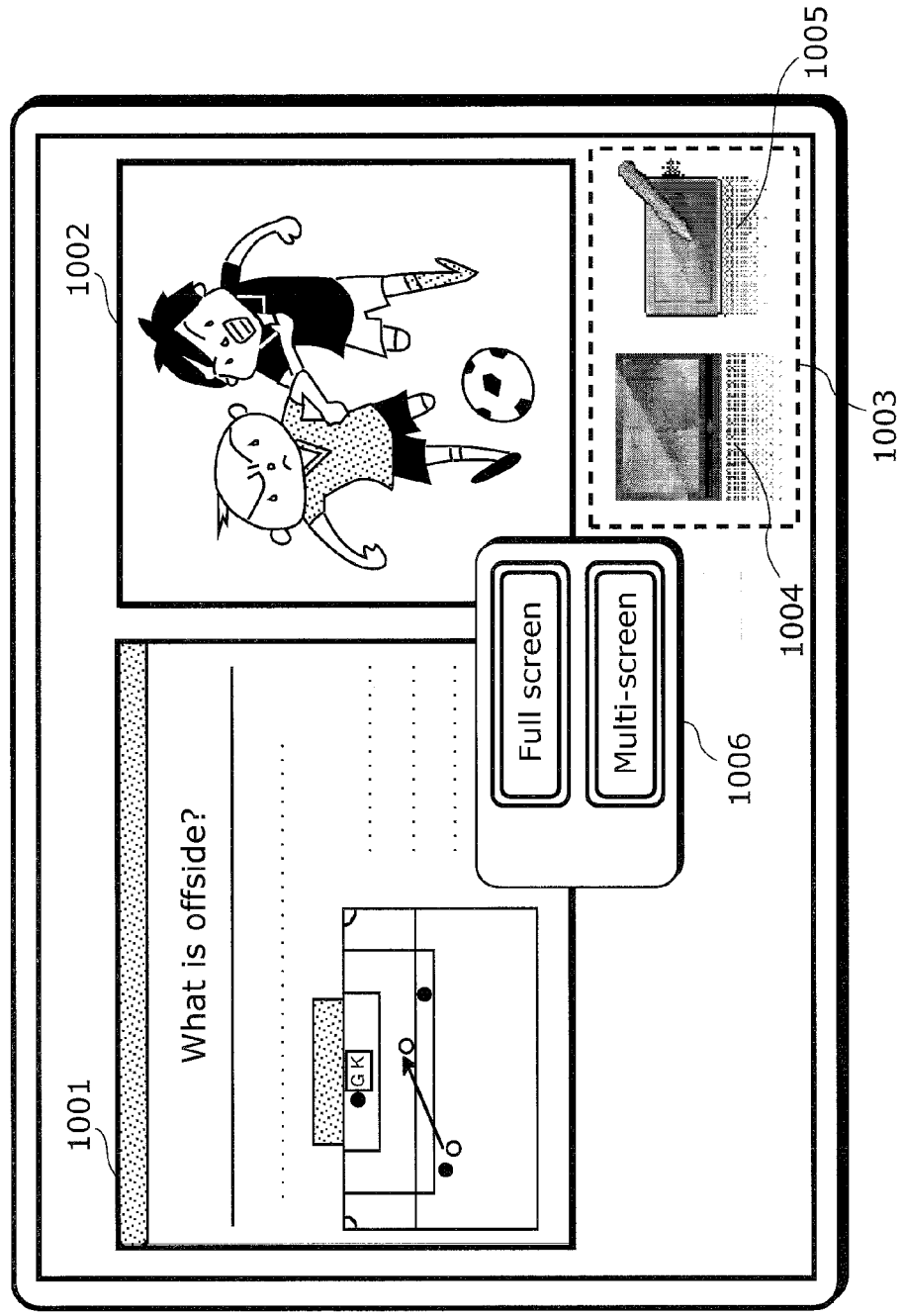
FIG. 10 illustrates an example of an output page of the related scene addition apparatus according to Embodiment 1 in the present invention.

The retrieval result output unit 111 combines the related scene having the duration Δt and extracted by the related scene extracting unit 108 with the scene-to-be-added retrieval result, and provides the combined result to the output unit 112 (S405). FIG. 10 illustrates an example of a display screen provided by the output unit 112. Here, a scene-to-be-added retrieval result 1001 and a related scene 1002 are combined, and the combined result is displayed on the display screen. Furthermore, an icon group 1003 for use in transmitting the retrieval result added with the related scene 1002, and a menu button 1006 are also displayed on the display screen. The menu button 1006 is a button for specifying a display method executed by another terminal to which information is transmitted from the current terminal.

When the user desires to transmit the retrieval result to another terminal, the user clicks any one of the icons included in the icon group 1003 (an icon 1004 or 1005) and the menu button 1006. With the operation, the user requests the retrieval result transmitting unit 113 to transmit a retrieval result added with the related scene (S303).

Figure 11A:
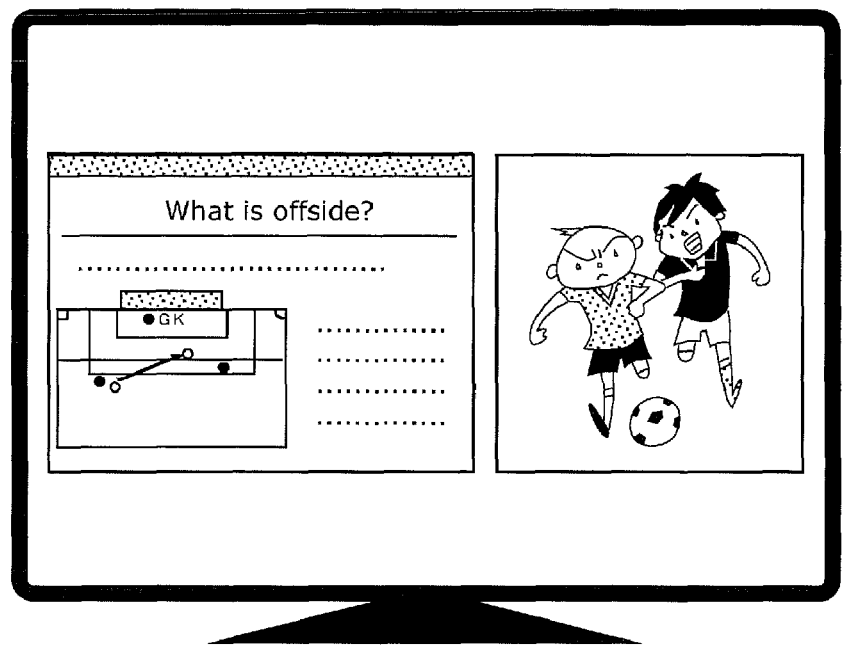
FIG. 11A illustrates an example of an output page of a shared television according to Embodiment 1 in the present invention.
Figure 11B:
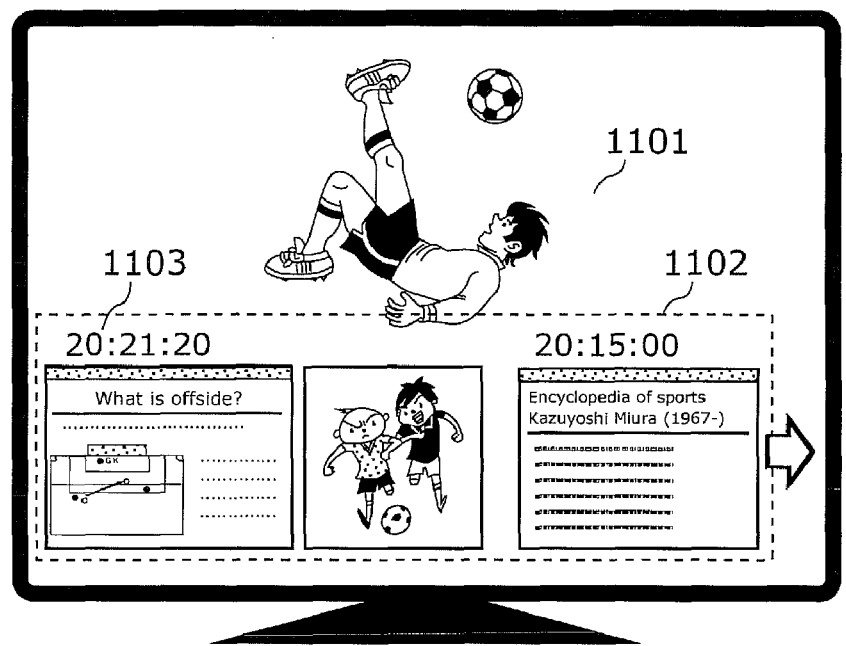
FIG. 11B illustrates an example of an output page of a shared television according to Embodiment 1 in the present invention.

In response to the request from the user (S303), the retrieval result transmitting unit 113 transmits the retrieval result added with the related scene to a specified destination (S406). The user transmits the retrieval result added with the related scene, for example, using the icon group 1003 displayed on the display screen illustrated in FIG. 10. When the user desires to transmit the retrieval result to the shared television 114, he/she selects the icon 1004. In contrast, when the user desires to transmit it to the mobile terminal 1601 other than the shared television 114, such as a PC and a mobile phone, he/she selects the icon 1005. Furthermore, when the retrieval result added with the related scene is transmitted to a terminal to which the moving image content is broadcast and which reproduces the moving image content, there are troublesome cases where the moving image content displayed on the terminal cannot be watched. Thus, when the user selects one of the icon 1004 and the icon 1005, the output unit 112 displays the menu button 1006 on the display screen, and enables selection of a display method after transmitting the retrieval result. For example, when the user selects a menu button "full screen", the retrieval result transmitting unit 113 transmits data for displaying the retrieval result added with the related scene on a display screen of the terminal that is the specified destination, using the full screen mode. In contrast, when the user selects a menu button "multi-screen", the retrieval result transmitting unit 113 transmits data for displaying the retrieval result added with the related scene on a display screen of the terminal that is the specified destination, while the moving image content that is being reproduced or broadcast on the display screen is partly displayed. FIGS. 11A and 11B illustrate the example of the display screen. FIG. 11A illustrates an example of a display screen of the terminal to which the retrieval result is transmitted, when the user selects the menu button "full screen" from the menu button 1006 displayed on the display screen in FIG. 10. Only the retrieval result added with the related scene transmitted by the related scene addition apparatus 100 is displayed on the display screen of the terminal. In contrast, FIG. 11B illustrates an example of a display screen, when the user selects the menu button "multi-screen" from the menu button 1006 displayed on the display screen in FIG. 10. Plural windows are displayed on the display screen of the terminal. In other words, what is displayed on the display screen of the terminal is a display screen 1101 on which a moving image content that is being reproduced or broadcast is displayed, and a display window 1102 including retrieval results that are added with related scenes and have been previously transmitted to the terminal. The retrieval result added with a related scene included in the display window 1102 is displayed in combination with a retrieval start time 1103 for each of the retrieval results. Here, other than the retrieval start time 1103, information related to a sender of a retrieval result may be displayed together. The display method as illustrated in FIG. 11B allows the user to share the retrieval result among plural users without disturbing the user for watching the moving image content. In addition, the user can easily share a result previously shared again. Thereby, the display method, for example, facilitates the explanation to a user who was not present when the result was first shared. Furthermore, the moving image content that is being watched cannot be watched according to the display method as illustrated in FIG. 11A. Thus, with the click of the menu button "full screen" on the display screen in FIG. 10 by the user, a control may be performed so that another menu button, such as "immediately displayed" and "displayed later" appears. Then, in the case where the user selects the menu button "displayed later", when the next commercial message is broadcast, another control may be performed so that the retrieval result is displayed on the terminal at the specified destination.

FIG. 1 illustrates an example of displaying a retrieval result added with a related scene. As illustrated in FIG. 1, the result of the retrieval by the related scene addition apparatus 100 and the related scene are transmitted to the shared television 114 and the mobile terminal 1601 via the computer network 1602, and the result is displayed thereon.

As described above, the related scene addition apparatus 100 according to Embodiment 1 extracts a related scene of the moving image content which motivates the user to retrieve the information, using the operation records of the user's retrieval of information and the information retrieval results of each of the scenes. Thus, a related scene can be extracted even from a moving image content whose text information is not added to each of the scenes. Furthermore, there is no need to enter a keyword only for extracting a related scene. Thus, the user's load of adding the related scene to the information retrieval result can be reduced.

In the determination of whether or not the retrieval of the equivalent item ends in the comparison process (S803), the first similarity is used. The first similarity is a similarity between (i) an input word vector generated from a group of words entered or selected by the user and (ii) a retrieval result vector generated from a scene-to-be-added retrieval result. However, the determination of whether or not the user has retrieved an item equivalent to an item obtained for the scene-to-be-added retrieval result does not solely depend on the aforementioned method. For example, the first similarity may be replaced with a similarity between a retrieval keyword vector and the input word vector. The retrieval keyword vector is generated by vectorizing a retrieval keyword entered for obtaining the scene-to-be-added retrieval result in the same manner as generating the input word vector.

Furthermore, the following describes three variations as other determination methods executable in the configuration according to Embodiment 1.

(Variation 1)

Variation 1 differs from Embodiment 1 in that the retrieval state determining unit 706 determines whether or not the user has retrieved the equivalent item using the second similarity in the comparison process (S803 in FIG. 8). In other words, Variation 1 uses a feature that a similarity between words entered or selected is larger during the retrieval of the same item. Using the feature, the retrieval state determining unit 706 calculates the second similarity by comparing the input word vectors between the adjacent operation records. When the second similarity is larger than the threshold, the retrieval state determining unit 706 determines that the same item has been retrieved between the adjacent operation records. For example, suppose a case where a retrieval state of the operation number 8 is determined as the specific example of the similarity information in FIG. 9. The retrieval state determining unit 706 calculates the second similarity that is a similarity between (i) an input word vector of the "rule book (offside)" that is an input in the operation number 10 temporally subsequent to the operation number 8 and (ii) an input word vector of the "offside (soccer)" that is an input in the operation number 8. Then, the retrieval state determining unit 706 stores the second similarity in the column of the second similarity 906. The retrieval state determining unit 706 determines whether or not the same item has been retrieved by comparing the calculated second similarity with the threshold. For example, although the second similarity is larger than the threshold in the retrieval states of the operation numbers 8 and 7, it is assumed that the second similarity is equal to or smaller than the threshold in the retrieval state of the operation number 5. In this case, although the same item has been retrieved in the operation numbers 8 and 7, it is clear that another item has been retrieved in the operation number 5. Thus, the operation number 7 that is temporally the earliest is determined as the retrieval start point.

Although Variation 1 describes the method of comparing adjacent input word vectors, the method is not limited to such. Although, for example, the scene-to-be-added retrieval result is displayed in Embodiment 1, whether or not the same item has been retrieved may be determined by comparing a similarity between the input word vector of an operation record immediately before the displayed time and another input word vector with a threshold.

Thus, the determination of whether or not the same item has been retrieved using only input word vectors needs no process of analyzing a scene-to-be-added retrieval result and generating a retrieval result vector representing a whole page. Thus, an amount of calculation in the processes can be reduced.

(Variation 2)

Variation 2 differs from Embodiment 1 in a method of determining whether or not the user has retrieved the same item. More specifically, while the retrieval state determining unit 706 retrieves the same item in the comparison process (S803 in FIG. 8), the determination is made using the feature that a similarity between words included in text of a browsed page is larger. In other words, the retrieval state determining unit 706 calculates a similarity between adjacent pages that have been browsed by the comparison therewith, and determines that the same item has been retrieved among the adjacent pages browsed when the similarity is larger than the threshold. More specifically, the page information collecting unit 704 obtains a displayed URL of a page browsed by the user, from among the operation records stored in the operation record storage unit 105. The information retrieving unit 102 obtains page information associated with the displayed URL. The retrieval state determining unit 706 of the retrieval start time estimating unit 107 extracts at least one word from text information included in the obtained page information. The retrieval state determining unit 706 requests the page similarity calculating unit 705 to calculate a similarity between pages, and determines whether or not the user has retrieved the same item using the similarity calculated by the page similarity calculating unit 705.

Figure 12:
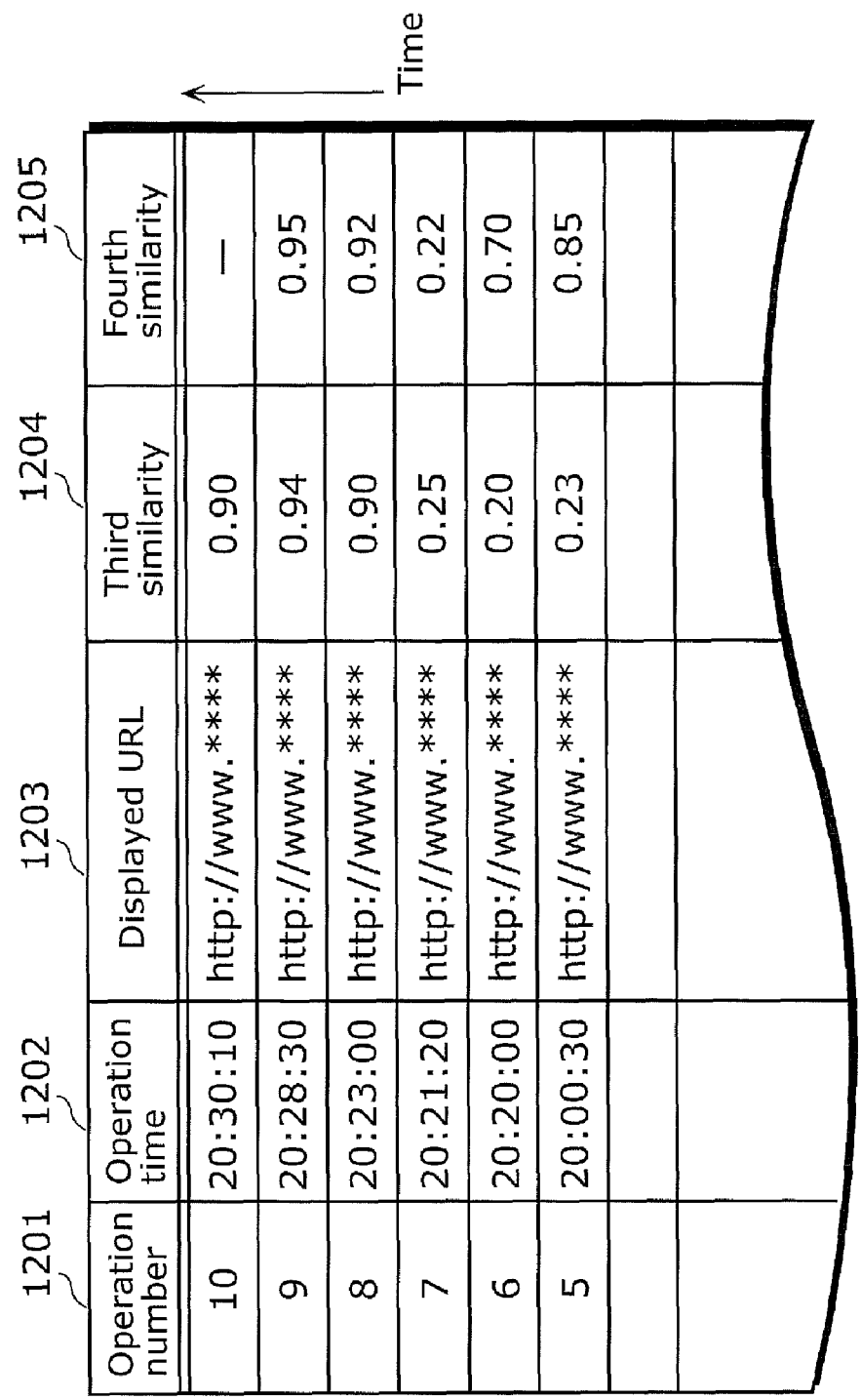
FIG. 12 illustrates an example of similarity information stored in a similarity storage unit according to Embodiment 1 in the present invention.

Here, the similarity between pages to be used for the determination may be obtained in the same manner as in the case where the group of words entered or selected is used. In other words, a similarity between a vector indicating text information included in a page of the scene-to-be-added retrieval result and a vector indicating text information included in each page browsed by the user may be determined as a similarity between pages. Furthermore, a similarity between vectors each indicating text information included in adjacent pages that have been browsed may be determined as a similarity between pages. Furthermore, instead of calculating a similarity using a matrix as described above, simply the number of words included in common in two pages is counted, and when the number of words is equal to or smaller than a threshold, it may be determined that the same item has not been retrieved. Here, FIG. 12 illustrates an example of the similarity information stored in the similarity storage unit 707 when pages are used. The similarity information includes similarity records including an operation number 1201, an operation time 1202, a displayed URL 1203, a third similarity 1204, and a fourth similarity 1205. The operation number 1201, the operation time 1202, and the displayed URL 1203 respectively correspond to the operation number 501, the operation time 502, and the displayed URL 503 of the operation records in FIG. 5. The third similarity 1204 indicates a similarity between a page of a scene-to-be-added retrieval result and a page browsed in each operation number. Furthermore, the fourth similarity 1205 indicates a similarity between (i) a page browsed in each operation number and (ii) a page browsed in an operation record immediately prior to the operation record of the corresponding page (temporally immediately subsequent to the operation record of the corresponding page).

When whether or not the same item has been retrieved is determined using only a similarity between words, it is necessary to as precisely calculate the similarity between words. In order to do that, it is necessary to create a text corpus for use in quantifying the similarity from a large volume and varieties of documents. However, many words are used for determining whether or not the same item has been retrieved, using only a similarity between pages. Thus, compared to the determination using only the similarity between words, the precision of the similarity between words which is calculated in advance is not required. Furthermore, when the similarity is calculated simply using the appearance frequency of shared words, there is no need to calculate the similarity between words in advance. Thus, there is no need to perform a process of collecting a corpus in advance, a process of quantifying a similarity between words, and a process of comparing vectors. Thus, the comparison process (S803 in FIG. 8) can be implemented in a simpler configuration of a system.

Furthermore, in Variation 2, text information items are compared to each other. Thus, compared to a comparison between words in Embodiment 1, an amount of information to be compared becomes larger. Thus, the similarity can be calculated with precision:

In Variation 2, the similarity is determined using text information included in a page. Furthermore, when a similarity is determined using web pages, a URL is associated with each web page. Thus, whether or not each web page has the same item may be determined using information of URLs.

(Variation 3)

Variation 3 differs from Embodiment 1 in a method of determining whether or not the user has retrieved the same item. More specifically, while the retrieval state determining unit 706 performs the determination in the comparison process (S803 in FIG. 8) using the feature that the keywords entered by the user overlap between operations while the same item is to be retrieved.

When information is to be retrieved by entering keywords, in the case where the number of retrieval results are too many and the number of retrieval results that are associated with each other are too small, the user reenters a keyword for improving as the retrieval precision. Normally, when retrieval results are narrowed down or retrieval precision is increased, the user corrects a keyword to be entered for retrieval. For example, as in the operation numbers 2 and 4 in FIG. 5, the user adds input keywords, and retains part of the keywords as they are while changing the remaining keywords. Accordingly, the retrieval state determining unit 706 compares input words entered in the previous operation with input words entered in the current operation. When some of words are changed or at least a word is added, it is possible to determine that the same item has been retrieved between operations. Adding a word is, in other words, to combine at least an input word newly added in the current operation with the input words in the previous operation using a predetermined operator (for example, AND operator or OR operator) in the retrieval of information using keywords.

As such, when it is determined whether or not the same item has been retrieved using a relationship between keywords entered by the user, the input operations of keywords by the user are necessary. However, there is no need to calculate a similarity between words in advance. Thus, there is no need to perform a process of collecting a corpus in advance, a process of quantifying a similarity between words, and a process of comparing vectors. Thus, information can be retrieved with a simpler configuration of a system.

Embodiment 2

In Embodiment 1, a fixed value predetermined by the system developer is used to calculate the duration $\Delta t$ of a related scene to be extracted. In Embodiment 2, assuming that the duration $\Delta t$ should differ according to each item retrieved by the user, the duration $\Delta t$ is determined using a word entered or selected by the user and a retrieval result. Thus, the appropriate duration $\Delta t$ can be automatically determined according to the retrieval result.

The main difference with Embodiment 1 is that the related scene extracting unit further determines $\Delta t$ in the process of extracting a related scene (S404 in FIG. 4) in Embodiment 2. Other constituent elements and the processing executed by each of the constituent elements are the same as those of Embodiment 1. Thus, the differences with Embodiment 1 are mainly described in Embodiment 2.

Figure 13:
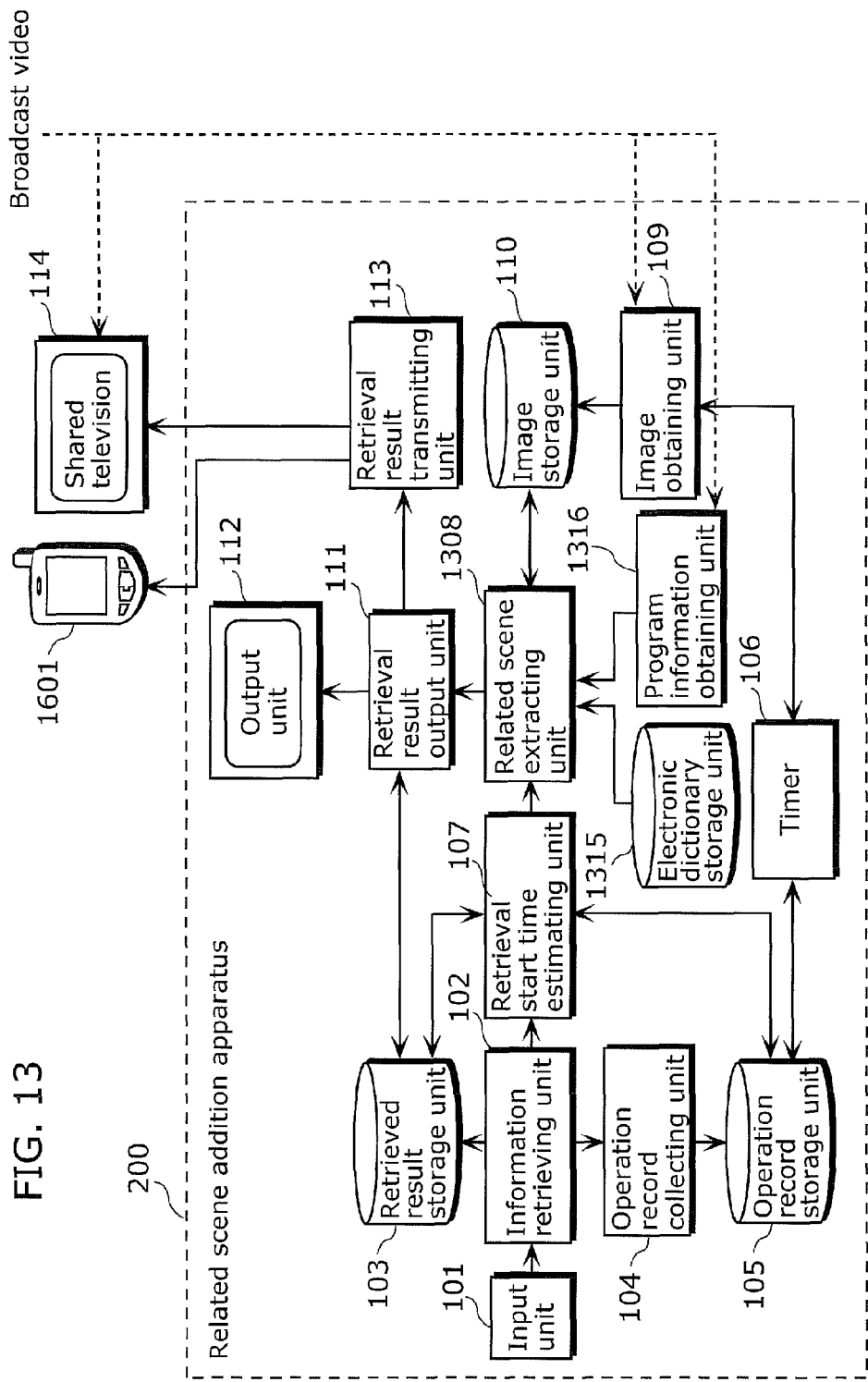
FIG. 13 is a block diagram illustrating a configuration of a retrieval system according to Embodiment 2 in the present invention.

FIG. 13 is a block diagram illustrating a configuration of a retrieval system according to Embodiment 2 in the present invention. The retrieval system uses a related scene addition apparatus 200, instead of the related scene addition apparatus 100 in the configuration of the retrieval system in FIG. 1.

The related scene addition apparatus 200 in Embodiment 2 includes a related scene extracting unit 1308, instead of the related scene extracting unit 108 in the configuration of the related scene addition apparatus 100 according to Embodiment 1 and illustrated in FIG. 2. Furthermore, the related scene addition apparatus 200 includes an electronic dictionary storage unit 1315 and a program information obtaining unit 1316, in addition to the configuration of the related scene addition apparatus 100 in Embodiment 1.

The related scene addition apparatus 200 is configured with a general-purpose computer including a Central Processing Unit (CPU), a memory, and a communication interface. Each of the processing units included in the related scene addition apparatus 200 is functionally implemented by executing a program for implementing each of the processing units on the CPU. Furthermore, each of the storage units is implemented by a memory and a Hard Disk Drive (HDD).

The electronic dictionary storage unit 1315 is a storage device that stores descriptions of proper names and of words that describe movements, for example, a description related to a personal name, an animal name, and a geographical name, and a description related to a rule and a movement of a sport. Furthermore, the electronic dictionary storage unit 1315 stores information related to words and word classes of the words.

The program information obtaining unit 1316 is a processing unit for obtaining information related to a program stored in the image storage unit 110 through broadcasting, and, for example, obtains program information such as Electric Program Guide (EPG) data. In general, the program information includes a name of a program, a broadcasting date and time, a genre, a performer, and details of the program.

Figure 14:
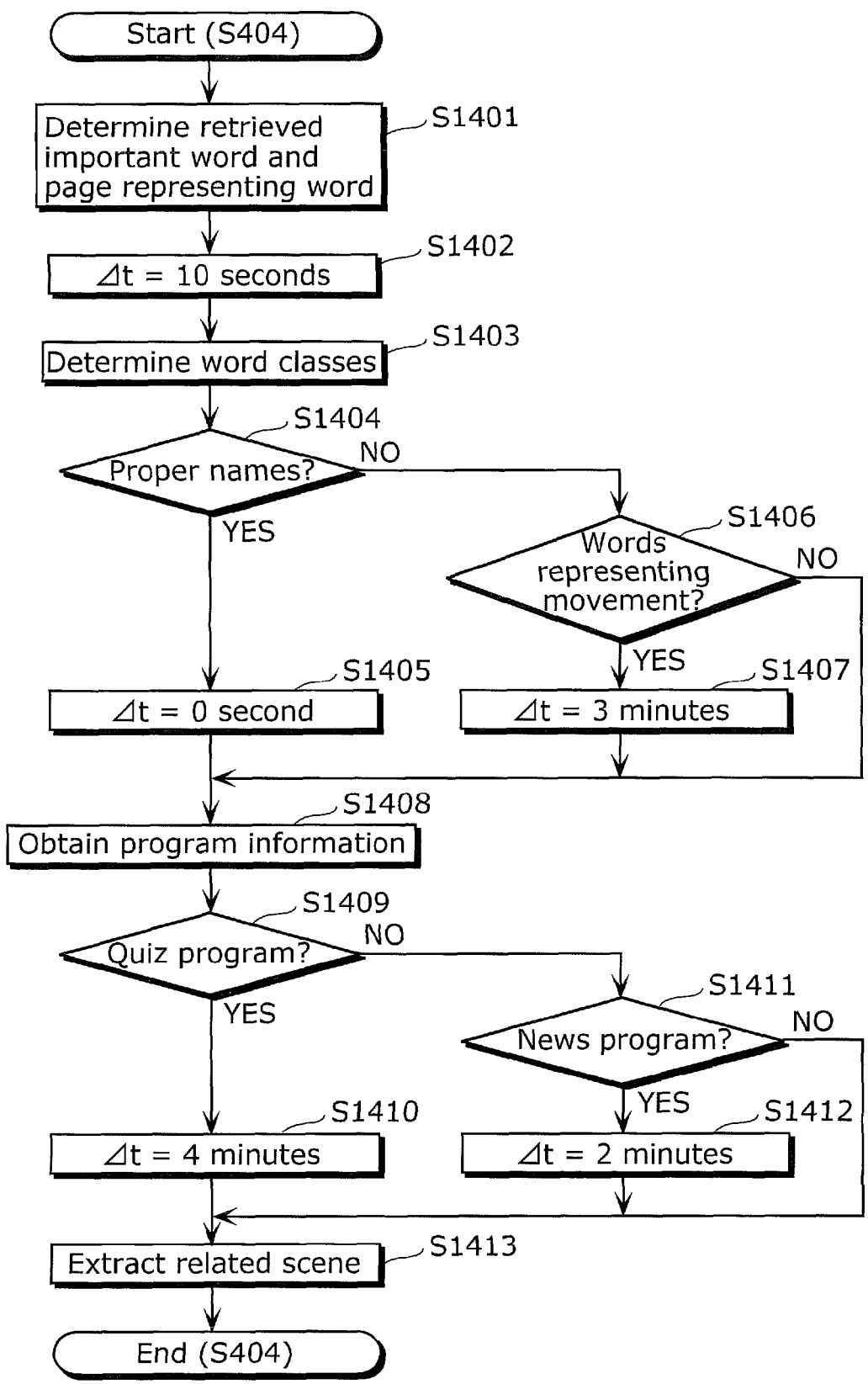
FIG. 14 shows a detailed flowchart of a process of extracting a related scene according to Embodiment 2 in the present invention.

Hereinafter, the details of the process of extracting a related scene (S404 in FIG. 4) will be described. FIG. 14 shows a detailed flowchart of the process of extracting a related scene (S404 in FIG. 4).

After determining the duration $\Delta t$ of a related scene (S1401 to S1412), the related scene extracting unit 1308 extracts a related scene having the duration $\Delta t$ from the image storage unit 110 (S1413).

In other words, the related scene extracting unit 1308 determines (i) words that seem important from information of a program for which a scene is extracted or from among words entered or selected by the user when a scene-to-be-added retrieval result has been retrieved (hereinafter referred to as "retrieved important words"), and (ii) words representative of a page of the scene-to-be-added retrieval result (hereinafter referred to as "page representing words") (S1401). The related scene extracting unit 1308 weights a word that frequently appears in a group of words entered or selected by the user or a word entered at the retrieval start point so that the weight of the word increases, and a score for each word is calculated. The related scene extracting unit 1308 determines, as the retrieved important words, a predetermined number of words in increasing order of the calculated scores. Furthermore, the related scene extracting unit 1308 determines, as the page representing words, words frequently appearing in text information included in a page of the scene-to-be-added retrieval result, or words used as a title of the page.

The related scene extracting unit 1308 sets the duration $\Delta t$ of a related scene to a default value of 10 seconds (S1402). Next, the related scene extracting unit 1308 determines respective word classes of the retrieved important words and the page representing words determined in the aforementioned processes, using the electronic dictionary storage unit 1315 (S1403).

The related scene extracting unit 1308 determines, with as reference to a result of the process of determining word classes (S1403), whether or not the retrieved important words and the page representing words include any proper names, such as a personal name, an animal name, and a geographical name (S1404). When determining that the proper names are included (Yes in S1404), the related scene extracting unit 1308 sets the duration $\Delta t$ shorter (for example, assuming that $\Delta t$ is zero, not moving images but still images are set) (S1405).

When determining that the proper names are not included (No in S1404), the related scene extracting unit 1308 determines, with reference to a result of the process of determining word classes (S1403), whether or not the retrieved important words and the page representing words include any words representing a movement (S1406). When determining that the words representing movement are included (Yes in S1406), the related scene extracting unit 1308 sets a predetermined length to the duration $\Delta t$ (for example, 3 minutes) (S1407).

For example, in the example of the operation record information in FIG. 5, while watching a program broadcasting a soccer game, the user has retrieved information related to "offside" in the operation record of the operation number 7. Here, the word "offside" is a word entered by the user at the retrieval start point, and is included in the selection item 505. Thus, the related scene extracting unit 1308 determines the word "offside" as a retrieved important word (S1401). Furthermore, since the word "offside" is a word representing a movement (No in S1404, Yes in S1406), the related scene extracting unit 1308 sets a duration during which the word represents the movement (for example, 3 minutes) to the duration $\Delta t$ (S1407).

Next, the related scene extracting unit 1308 obtains program information that motivates the retrieval at the retrieval start time point, from the program information obtained by the program information obtaining unit 1316 (S1408). The related scene extracting unit 1308 determines whether or not the genre of the program indicated in the obtained program information is a quiz as program (S1409). When the genre is the quiz program (Yes in S1409), the user often retrieves information related to answers of the quizzes. Thus, the related scene extracting unit 1308 sets an average duration required for quizzing and describing the answers (for example, 4 minutes) to the duration $\Delta t$ (S1410).

When the genre is not a quiz program ((No in S1409), the related scene extracting unit 1308 determines whether or not the genre of the program indicated in the obtained program information is a news program (S1411). When the genre is a news program (Yes in S1411), the user often retrieves information related to a topic of news. Thus, the related scene extracting unit 1308 sets an average duration required for describing one topic of news (for example, 2 minutes) to the duration $\Delta t$ (S1412). The aforementioned processes determine a value of $\Delta t$.

The related scene extracting unit 1308 extracts the moving image information in a range from (retrieval start time−$\Delta t$) to the retrieval start time, as a related scene from the image storage unit 110 (S1413). Here, when $\Delta t=0$, the related scene extracting unit 1308 extracts still images at the retrieval start time. When extracting a related scene, the related scene extracting unit 1308 may not extract the moving image information in a range from (retrieval start time−$\Delta t$) to the retrieval start time but set a margin $\alpha$, where $\alpha$ is a positive value. In other words, the related scene extracting unit 1308 may extract moving image information in a range from (retrieval start time−$\Delta t$−$\alpha$) to (retrieval start time+$\alpha$).

Here, the related scene extracting unit 1308 may determine a value of $\Delta t$ only using a genre of a program, without using a word class of a word. In other words, each value of $\Delta t$ is defined in association with a genre of a program, and is determined according to a genre of a program subject to retrieval of information. Thereby, there is no need to determine any retrieved important word and page representing word, or specify a type of a word, such as a word class. Thus, $\Delta t$ can be determined with the simpler processing. Furthermore, when a similarity between a retrieved important word and a page representing word is smaller and when it is not known as which word is used for determining $\Delta t$, the method using only a genre may be used.

Figure 15:
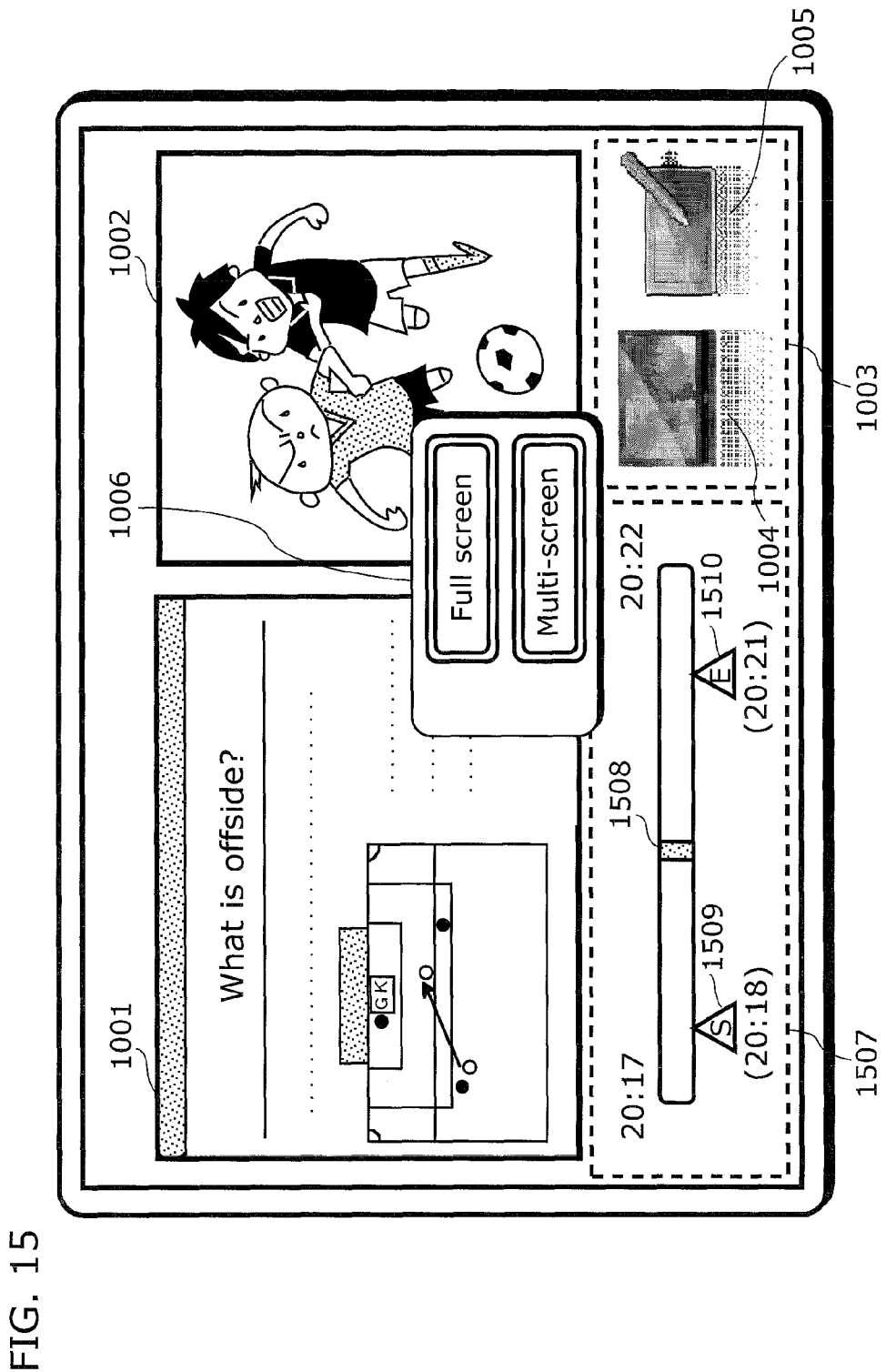
FIG. 15 illustrates an example of an output page of a related scene addition apparatus according to Embodiment 2 in the present invention.

FIG. 15 illustrates an example of a display screen provided by the output unit 112 through the process of providing a retrieval result (S405 in FIG. 4). The example of the display screen in FIG. 15 shows a display screen obtained by further adding an operation bar 1507 for reproducing moving images to the example of the display screen in FIG. 10. The operation bar 1507 represents a duration of a related scene by a length of the bar. Furthermore, a temporal position of a related scene 1002 that is currently being displayed is represented by a symbol 1508. Assumed in this example is that $\Delta t$ is 3 minutes and $\alpha$ is 1 minute. Furthermore, the retrieval start time is assumed to be 20:21 (time in the operation number 7 in FIG. 5). In this case, the moving images in a section from 20:17 (retrieval start time−$\Delta t$−$\alpha$) to 20:22 (retrieval start time+$\alpha$) are extracted as a related scene. What is displayed on a display screen as the related scene 1002 is the moving images in a section from 20:18 (retrieval start time−$\Delta t$) to 20:21 (retrieval start time). However, a duration of moving images to be displayed on a display screen as the related scene 1002 can be changed by changing the position of an icon 1509 or 1510.

As described above in Embodiment 2, the duration $\Delta t$ of a related scene can be automatically changed according to details to be retrieved. Thus, a related scene having an appropriate duration can be added to a retrieval result.

Although the retrieval system according to Embodiments and Variations in the present invention is described hereinbefore, the present invention is not limited to Embodiments and Variations.

Although the retrieval start time is, for example, the time at which the user starts retrieving information related to a scene-to-be-added retrieval result in Embodiments and Variations, it actually takes a predetermined time for the user from watching video of the scene to starting retrieval of the information. Thus, the retrieval start time may be the time preceding by a predetermined time period from the time at which the user starts retrieving information related to a scene-to-be-added retrieval result.

Embodiments disclosed herein are exemplary embodiments in all respects but do not limit the present invention. The scope of the present invention is described not by the description above but by the claims, and all variations within the meaning and range of equivalency of the various claim elements are embraced within the scope of the corresponding claims.

Since the present invention is generally applicable to a retrieval process based on moving images, it is also applicable not only to television broadcasting described in Embodiments and Variations but also to a moving image content on the Internet and to video privately captured. Furthermore, the method for sharing information is not limited to displaying it on a shared display described in Embodiments and Variations but allows for various use, such as attaching the information to a mail. Thus, the availability is enormous.

The present invention is applicable, when the user has retrieved information while watching a moving image content, to a corresponding scene addition apparatus, an information retrieval apparatus, and others for associating an information retrieval result with a scene of the moving image content.

The invention claimed is:

1. A related scene addition apparatus that associates a related scene with a retrieval result, the related scene being image data related to retrieval, said apparatus comprising:

an image storage unit configured to store the image data, and a time at which the image data is reproduced;
an information retrieving unit configured to retrieve information according to a retrieval condition entered by a user;
an operation record storage unit configured to store operation records in which the retrieval condition is associated with a time at which said information retrieving unit has received the retrieval condition;
a retrieval start time estimating unit configured to estimate a retrieval start time based on a retrieval start point from which an operation starts and which is included in the operation records related to a scene-to-be-added retrieval result, the retrieval start time being a time at which the user starts entering retrieval conditions including the retrieval condition for obtaining the scene-to-be-added retrieval result, and the scene-to-be-added retrieval result being retrieval information specified by the user in the information retrieved by said information retrieving unit; and
a related scene extracting unit configured to associate, with the scene-to-be-added retrieval result, the image data reproduced during a time period including the retrieval start time estimated by said retrieval start time estimating unit.

2. The related scene addition apparatus according to claim 1,
wherein said retrieval start time estimating unit is configured to estimate a retrieval start time based on a retrieval start point of an operation at an earliest time, from among the operation records related to the scene-to-be-added retrieval result, the retrieval start time being the time at which the user starts entering the retrieval conditions for obtaining the scene-to-be-added retrieval result, and the scene-to-be-added retrieval result being the retrieval information specified by the user in the information retrieved by said information retrieving unit.

3. The related scene addition apparatus according to claim 2,
wherein said retrieval start time estimating unit includes:
a word similarity calculating unit configured to calculate, for each of the operation records, a similarity between the scene-to-be-added retrieval result and a corresponding one of the retrieval conditions entered earlier than a time at which a first retrieval condition is entered, the first retrieval condition being a retrieval condition entered for retrieving the scene-to-be-added retrieval result; and
a retrieval start point estimating unit configured to identify a similarity calculated using a retrieval condition entered at a most distant time from the time at which the first retrieval condition is entered, from some of the similarities that are calculated by said word similarity calculating unit and larger than a predetermined value, to determine an operation at the most distant time as the retrieval start point, and to estimate the retrieval start time based on the determined retrieval start point.

4. The related scene addition apparatus according to claim 2,
wherein said retrieval start time estimating unit includes:
a word similarity calculating unit configured to calculate, for each of the operation records, a similarity between a first retrieval condition and a corresponding one of the retrieval conditions received by said information retrieving unit earlier than a time at which the first retrieval condition is entered, the first retrieval condition being a retrieval condition entered for retrieving the scene-to-be-added retrieval result; and
a retrieval start point estimating unit configured to identify a similarity calculated using a corresponding one of the retrieval conditions received by said information retrieving unit at a most distant time from the time at which the first retrieval condition is entered, from some of the similarities that are calculated by said word similarity calculating unit and larger than a predetermined value, to determine an operation at the most distant time as the retrieval start point, and to estimate the retrieval start time based on the determined retrieval start point.

5. The related scene addition apparatus according to claim 2,
wherein said retrieval start time estimating unit includes:
a word similarity calculating unit configured to calculate a similarity between retrieval conditions included in operation record groups, for each of the operation record groups, the operation record groups each being a group of temporally adjacent operation records entered earlier than a time at which a first retrieval condition for retrieving the scene-to-be-added retrieval result is entered; and
a retrieval start point estimating unit configured to identify a similarity calculated using a corresponding one of the retrieval conditions entered at a time closest to the time at which the first retrieval condition is entered, from some of the similarities that are calculated by said word similarity calculating unit and equal to or smaller than a predetermined value, to determine an operation at the closest time as the retrieval start point, and to estimate the retrieval start time based on the determined retrieval start point.

6. The related scene addition apparatus according to claim 2,
wherein said retrieval start time estimating unit includes:
a word similarity calculating unit configured to determine, for each of the operation record groups, whether or not retrieval conditions included in operation record groups have a common word, the operation record groups each being a group of temporally adjacent operation records entered earlier than a time at which a first retrieval condition for retrieving the scene-to-be-added retrieval result is entered; and
a retrieval start point estimating unit configured to identify, as the retrieval start point, an operation including a retrieval condition entered at a time closest to the time at which the first retrieval condition is entered, from at least one of the operation record groups determined as having no common word, and to estimate the retrieval start time based on the determined retrieval start point.

7. The related scene addition apparatus according to claim 2,
wherein said retrieval start time estimating unit includes:
a word similarity calculating unit configured to calculate, for each of the operation records, a similarity between the scene-to-be-added retrieval result and a retrieval result obtained based on a retrieval condition entered earlier than a time at which a first retrieval condition is entered, the first retrieval condition being a retrieval condition entered for retrieving the scene-to-be-added retrieval result; and
a retrieval start point estimating unit configured to identify a similarity calculated using a retrieval condition entered at a most distant time from the time at which the first retrieval condition is entered, from some of the similarities that are calculated by said word similarity calculating unit and larger than a predetermined value, to determine an operation at the most distant time as the retrieval start point, and to estimate the retrieval start time based on the determined retrieval start point.

8. The related scene addition apparatus according to claim 2,
wherein said retrieval start time estimating unit includes:
a word similarity calculating unit configured to calculate a similarity between retrieval conditions included in operation record groups, for each of the operation record groups, the operation record groups each being a group of temporally adjacent operation records entered earlier than a time at which a first retrieval condition for retrieving the scene-to-be-added retrieval result is entered; and
a retrieval start point estimating unit configured to identify a similarity calculated using a retrieval condition entered at a time closest to the time at which the first retrieval condition is entered, from some of the similarities that are calculated by said word similarity calculating unit and equal to or smaller than a predetermined value, to determine an operation at the closest time as the retrieval start point, and to estimate the retrieval start time based on the determined retrieval start point.

9. The related scene addition apparatus according to claim 1, further comprising
an electronic dictionary storage unit configured to store information related to words and word classes of the words,
wherein said related scene extracting unit is configured to determine a word class of a word related to the scene-to-be-added retrieval result with reference to the information stored by said electronic dictionary storage unit, to determine a duration according to the determined word class of the word, to extract, from the image data stored by said image storage unit, one of moving image data and still image data reproduced during the duration including the retrieval start time estimated by said retrieval start time estimating unit, and to associate the extracted one of moving image data and still image data, with the scene-to-be-added retrieval result.

10. The related scene addition apparatus according to claim 1, further comprising
a program information obtaining unit configured to obtain information related to a type of the image data stored by said image storage unit,
wherein said related scene extracting unit is configured to determine a type of moving image data reproduced at the retrieval start time with reference to the information obtained by said program information obtaining unit, to determine a duration according to the determined type of the moving image data, to extract, from the image data stored by said image storage unit, one of the moving image data and still image data reproduced during the duration including the retrieval start time estimated by said retrieval start time estimating unit, and to associate the extracted one of moving image data and still image data, with the scene-to-be-added retrieval result.

11. The related scene addition apparatus according to one of claim 10, further comprising
a retrieval result output unit configured to provide the scene-to-be-added retrieval result associated with one of the moving image data and the still image data extracted by said related scene extracting unit, to an external apparatus.

12. A retrieval system, comprising:
a display apparatus which displays moving image data; and
a related scene addition apparatus which associates a related scene with a retrieval result, the related scene being one of moving image data and still image data that motivates retrieval of information,
wherein said related scene addition apparatus includes:
an image storage unit configured to store the moving image data to be displayed on said display apparatus, and a time at which the moving image data is reproduced;
an information retrieving unit configured to receive a retrieval condition entered by a user, and to retrieve information according to the retrieval condition;
an operation record storage unit configured to store operation records in which the retrieval condition received by said information retrieving unit is associated with a time at which said information retrieving unit receives the retrieval condition;
a retrieval start time estimating unit configured to identify a retrieval start point from which an operation starts and which is included in the operation records stored by said operation record storage unit and related to a scene-to-be-added retrieval result, based on an association between the scene-to-be-added retrieval result and the operation records stored by said operation record storage unit, and to estimate a retrieval start time based on the retrieval start point, the scene-to-be-added retrieval result being a retrieval result specified by the user in the retrieval result retrieved by said information retrieving unit, and the retrieval start time being a time at which the user starts entering retrieval conditions including the retrieval condition for obtaining the scene-to-be-added retrieval result;
a related scene extracting unit configured to extract, from the moving image data stored by said image storage unit, one of the moving image data and the still image data reproduced during a duration including the retrieval start time estimated by said retrieval start time estimating unit, and to associate the extracted one of moving image data and still image data with the scene-to-be-added retrieval result; and
a retrieval result output unit configured to provide the scene-to-be-added retrieval result associated with one of the moving image data and still image data extracted by said related scene extracting unit, to said display apparatus,
wherein said display apparatus receives, from said retrieval result output unit, the scene-to-be-added retrieval result associated with one of the moving image data and still image data extracted by said related scene extracting unit, and displays the received scene-to-be-added retrieval result.

13. A related scene addition method of associating a related scene with a retrieval result, said method being executed by a related scene addition apparatus, and the related scene being one of moving image data and still image data that motivates retrieval of information,
wherein the related scene addition apparatus includes:
an image storage unit configured to store the moving image data, and a time at which the moving image data is reproduced; and
an operation record storage unit configured to store operation records in which the retrieval condition is associated with a time at which the retrieval condition has been received, and
said related scene addition method comprises:
retrieving information according to a retrieval condition entered by a user upon receipt of the retrieval condition;
identifying a retrieval start point from which an operation starts and which is included in the operation records stored by the operation record storage unit and related to a scene-to-be-added retrieval result, based on an association between the scene-to-be-added retrieval result and the operation records stored by the operation record storage unit, and estimating a retrieval start time based on the retrieval start point, the scene-to-be-added retrieval result being a retrieval result specified by the user in the retrieval result retrieved in said retrieving, and the retrieval start time being a time at which the user starts entering retrieval conditions including the retrieval condition for obtaining the scene-to-be-added retrieval result; and extracting, from the moving image data stored by the image storage unit, one of the moving image data and the still image data reproduced during a duration including the retrieval start time estimated in said estimating, and associating the extracted one of moving image data and still image data with the scene-to-be-added retrieval result.

14. A program stored in a non-transitory computer readable storage medium, said program causing a computer to associate a related scene with a retrieval result, the related scene being one of moving image data and still image data that motivates retrieval of information, wherein a memory stores (i) the moving image data, and a time at which the moving image data is reproduced, and (ii) operation records in which a retrieval condition entered by a user is associated with a time at which the retrieval condition has been received, and said program comprises:

retrieving information according to the retrieval condition entered by the user upon receipt of the retrieval condition;

identifying a retrieval start point from which an operation starts and which is included in the operation records stored by the memory and related to a scene-to-be-added retrieval result based on an association between the scene-to-be-added retrieval result and the operation records stored by the memory, and estimating a retrieval start time based on the retrieval start point, the scene-to-be-added retrieval result being a retrieval result specified by the user in the retrieval result retrieved in the retrieving, and the retrieval start time being a time at which the user starts entering retrieval conditions including the retrieval condition for obtaining the scene-to-be-added retrieval result; and extracting, from the moving image data stored by the memory, one of the moving image data and the still image data reproduced during a duration including the retrieval start time estimated in the estimating, and associating the extracted one of moving image data and still image data with the scene-to-be-added retrieval result.

15. A retrieval start time estimating apparatus, comprising:

an image storage unit configured to store image data, and a time at which the image data is reproduced;

an information retrieving unit configured to retrieve information according to a retrieval condition entered by a user;

an operation record storage unit configured to store operation records in which the retrieval condition is associated with a time at which said information retrieving unit has received the retrieval condition; and a retrieval start time estimating unit configured to estimate a retrieval start time based on a retrieval start point from which an operation starts and which is included in the operation records related to a scene-to-be-added retrieval result, the retrieval start time being a time at which the user starts entering retrieval conditions including the retrieval condition for obtaining the scene-to-be-added retrieval result, and the scene-to-be-added retrieval result being retrieval information specified by the user in the information retrieved by said information retrieving unit.

16. A method of estimating a retrieval start time, said method being executed by a retrieval start time estimating apparatus, wherein the retrieval start time estimating apparatus includes:

an image storage unit configured to store image data, and a time at which the image data is reproduced; and an operation record storage unit configured to store operation records in which a retrieval condition entered by a user is associated with a time at which the retrieval condition has been received, and said method comprises:

retrieving information according to the retrieval condition; and estimating a retrieval start time based on a retrieval start point from which an operation starts and which is included in the operation records related to a scene-to-be-added retrieval result, the scene-to-be-added retrieval result being a retrieval result specified by the user in the retrieval result retrieved in said retrieving, and the retrieval start time being a time at which the user starts entering retrieval conditions including the retrieval condition for obtaining the scene-to-be-added retrieval result.

* * * * *